United States Patent
Borntrager et al.

(10) Patent No.: US 8,186,931 B2
(45) Date of Patent: *May 29, 2012

(54) POWERED HAND TRUCK

(76) Inventors: Steven Borntrager, Stonefort, IL (US); James Borntrager, Stonefort, IL (US)

( * ) Notice: Subject to any disclaimer, the term of this patent is extended or adjusted under 35 U.S.C. 154(b) by 206 days.

This patent is subject to a terminal disclaimer.

(21) Appl. No.: 12/659,484

(22) Filed: Mar. 10, 2010

(65) Prior Publication Data

US 2010/0183412 A1   Jul. 22, 2010

Related U.S. Application Data

(60) Continuation-in-part of application No. 12/285,244, filed on Sep. 30, 2008, now Pat. No. 7,704,035, which is a division of application No. 11/822,844, filed on Jul. 10, 2007, now Pat. No. 7,597,522.

(60) Provisional application No. 60/838,138, filed on Aug. 17, 2006.

(51) Int. Cl.
   *B66F 9/06* (2006.01)
(52) U.S. Cl. ........ 414/490; 187/231; 187/234; 187/238; 254/10 R; 414/909; 414/917
(58) Field of Classification Search .................. 187/231, 187/234, 238; 212/901; 254/10 R; 414/444, 414/446, 490, 608, 703, 909, 917
   See application file for complete search history.

(56) References Cited

U.S. PATENT DOCUMENTS

| | | | |
|---|---|---|---|
| 2,851,179 A | 9/1958 | Vance |
| 3,485,314 A | 12/1969 | Herr |
| 3,489,249 A | 1/1970 | Stammen |
| 3,799,379 A | 3/1974 | Grether et al. |
| 3,805,979 A | 4/1974 | Stoltz |
| 4,049,083 A | 9/1977 | Garvey |

(Continued)

FOREIGN PATENT DOCUMENTS

GB   2157684   1/1993
(Continued)

OTHER PUBLICATIONS

Website, http://www.liftproducts.com/Mobilelifts/Max_Stacker.html, series of models of manual and powered walk-behind lifts, five sheets printed from the internet on May 13, 2006.

*Primary Examiner* — James Keenan
(74) *Attorney, Agent, or Firm* — Richard C. Littman

(57) ABSTRACT

The powered hand truck has a chassis supported at one end by a single axle with two independently operable drive wheels. A prime mover is provided generally medially on the chassis, driving the drive wheels and powering the forklift mechanism. There is no operator console housing for the powered hand truck, as it is intended to be remotely controlled. A transmitter provides for specific and precise control of each drive wheel independently of the other, by using two drive wheel control switches. The powered hand truck has a caster wheel actuation strut housing over the caster wheel end of the chassis. A storage rack and dolly may be installed upon a suitable transport vehicle for transporting the powered hand truck. The hand truck forks engage the storage rack dolly, with the dolly translating along the rack to allow the truck to be deployed from, or loaded onto, the transport vehicle.

16 Claims, 21 Drawing Sheets

U.S. PATENT DOCUMENTS

| | | | |
|---|---|---|---|
| 4,266,795 A | 5/1981 | Walker | |
| RE31,178 E * | 3/1983 | Deacon | 414/917 |
| 4,396,341 A | 8/1983 | Brouwer et al. | |
| 4,571,139 A | 2/1986 | Moseley et al. | |
| 4,618,306 A * | 10/1986 | Dorsch | 414/909 |
| 4,629,391 A | 12/1986 | Soyk et al. | |
| 4,708,577 A | 11/1987 | Fratzke | |
| 4,714,140 A * | 12/1987 | Hatton et al. | 414/909 |
| 4,728,245 A | 3/1988 | Shelton | |
| 4,921,075 A | 5/1990 | Schumacher et al. | |
| 5,117,944 A | 6/1992 | Hurtevent | |
| 5,275,526 A * | 1/1994 | Moseley | 414/917 |
| 5,375,963 A * | 12/1994 | Wohlwend | 414/917 |
| 5,647,554 A * | 7/1997 | Ikegami et al. | 414/909 |
| D420,481 S | 2/2000 | Yates | |
| 6,062,800 A | 5/2000 | Perry et al. | |
| D468,884 S | 1/2003 | Ito | |
| 6,536,709 B1 | 3/2003 | McVaugh | |
| 6,572,322 B2 | 6/2003 | Karr | |
| 7,004,454 B2 * | 2/2006 | Petrone et al. | 254/10 R |
| 2001/0026756 A1 | 10/2001 | Mortimore | |
| 2001/0038786 A1 | 11/2001 | Kim | |
| 2003/0029647 A1 | 2/2003 | Trego et al. | |
| 2004/0076501 A1 | 4/2004 | McGill et al. | |
| 2004/0265113 A1 | 12/2004 | Quinlan et al. | |
| 2010/0080682 A1 * | 4/2010 | Keeven et al. | 187/234 |

FOREIGN PATENT DOCUMENTS

| | | | |
|---|---|---|---|
| JP | 2-133232 | 5/1990 | |
| JP | 3-067898 A * | 3/1991 | 414/608 |
| JP | 5-310397 A * | 11/1993 | 187/234 |

* cited by examiner

POWERED HAND TRUCK

REFERENCE TO RELATED PATENT APPLICATIONS

This application is a continuation-in-part of U.S. patent application Ser. No. 12/285,244, filed on Sep. 30, 2008, now issued as U.S. Pat. No. 7,704,035, which is a division of U.S. patent application Ser. No. 11/822,844 filed on Jul. 10, 2007, now issued as U.S. Pat. No. 7,597,522 on Oct. 6, 2009, which claimed the benefit of U.S. Provisional Patent Application Ser. No. 60/838,138, filed on Aug. 17, 2006.

BACKGROUND OF THE INVENTION

1. Field of the Invention

The present invention relates generally to small, portable, powered lifting and transport devices. More particularly, the present invention comprises a powered hand truck having a self-contained prime mover on board, which powers a hydraulic system for driving the wheels and lifting mechanism of the device.

2. Description of the Related Art

A number of powered devices comprising a wide array of different configurations have been developed in the past for the powered lifting and carriage of large, bulky articles. The conventional forklift in its various configurations is a well-known example of such. However, such forklift type vehicles are not suitable for use in the operating environment of the present invention due to their relatively bulky configuration, wheel configuration, etc.

Various other specialized powered machines for lifting various heavy and/or bulky articles have also been developed in the past. An example of such is found in Japanese Patent No. 2-133,232, published on May 22, 1990. The '232 patent describes (according to the drawings and English abstract) various improvements in a relatively small, lightweight powered forklift type device, with the improvements primarily directed to a specially configured frame and balance weights to reduce vibration. The forklift device itself has four wheels, with two closely spaced directional guidance wheels controlled by a vertical column connected thereto and controlled by an operator who may ride upon a small platform extending from the device. The controls are deployed from a fixed location on the machine and cannot articulate to suit the location or position of the operator.

None of the above inventions and patents, taken either singly or in combination, is seen to describe the instant invention as claimed. Thus, a powered hand truck solving the aforementioned problems is desired.

SUMMARY OF THE INVENTION

The powered hand truck is configured particularly for lifting and transporting heavy and/or large and bulky objects, e.g., skid-mounted portable buildings and sheds, dumpsters and cargo containers, etc., over relatively short distances. The device is particularly valuable in industrial environments, such as portable shed and outbuilding construction companies, tree and plant nurseries where such buildings are used for various operations, farm operations, etc. A vehicle-mounted storage rack may also be provided for transport of the device to various sites where it is needed, e.g., residential construction and industrial sites where movement of a storage shed, dumpster, or similar large, heavy, and bulky object is required and where movement of the object using a larger and heavier conventional utility vehicle, e.g., truck, tractor or tracked vehicle, etc., is impracticable due to space limitations for access and maneuvering, potential damage to landscape, etc.

The powered hand truck has a base platform or chassis supported by only a single axle having two opposed wheels. Each wheel includes a drive motor (e.g., hydraulic motor) at its hub, with differential power to the two wheels being used to turn and steer the machine. The power plant for operation of the drive motors is disposed on the chassis behind the axle, with an operator platform and control pedestal or console extending further rearwardly beyond the motor. An alternate embodiment may include castering wheels at the operator platform end of the machine for supporting that end of the machine when an operator is standing upon the platform and no load is applied to the lift mechanism to counterbalance the weight of the operator.

A support column for the lift mechanism is pivotally mounted above the center of the axle and allows the lift mechanism to pivot left or right relative to the longitudinal axis of the chassis for greater maneuverability and versatility. The lift mechanism comprises upper and lower pairs of parallel arms extending from the support column, with the distal ends of the arms attaching to a fork lift mast, which remains parallel to the lift mechanism support column at all times. This arrangement results in the forks being carried close to the two support wheels and tires when the forks are close to the surface, with the forks and arms swinging upwardly and outwardly away from the chassis as the arms rise to a horizontal orientation. The forks move back closer to the vehicle as the arms continue to rise, thereby moving the center of gravity of the load closer to the vehicle when the load is lifted to a relatively great height. The forks are raised by a hydraulic cylinder, which extends between the lower set of arms and the upper end of the forklift mast. A forklift mast extension winch is provided at the top of the mast to raise the upper portion of the mast and its lateral brace as required during certain operations.

The forklift actuation cylinder, as well as the throttle or speed control for the motor and individual controls for the two drive motors located at the wheels, are disposed at the distal end of a console or pedestal, which may articulate from the chassis opposite the axle end thereof in the embodiment of the machine that includes only the two main drive wheels. The operator platform is cantilevered from the chassis beyond the base of the console. In an alternative embodiment, the powered hand truck may be remotely controlled if so desired.

A storage rack for the powered hand truck may be provided on the bed of a light truck or other suitable transport vehicle, as desired. The storage rack comprises a laterally disposed track mechanism with a hand truck storage dolly secured to the track mechanism. The dolly is drawn back and forth along the tracks by a motorized chain drive. The forks of the powered hand truck engage the dolly, with the fork lift mechanism of the hand truck raising and lowering the hand truck relative to the forks and dolly in order to deploy the hand truck from the storage rack and transport vehicle upon which it is mounted, and to return the hand truck to the storage rack and transport vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a powered hand truck for the movement of relatively large and heavy objects (e.g., skid mounted portable buildings, dumpsters, etc.) over relatively short distances. A portable storage rack for mounting upon a transport vehicle (e.g., flat bed pickup truck, etc.) is also provided for the transport of the powered hand truck, as required.

Figure 1:
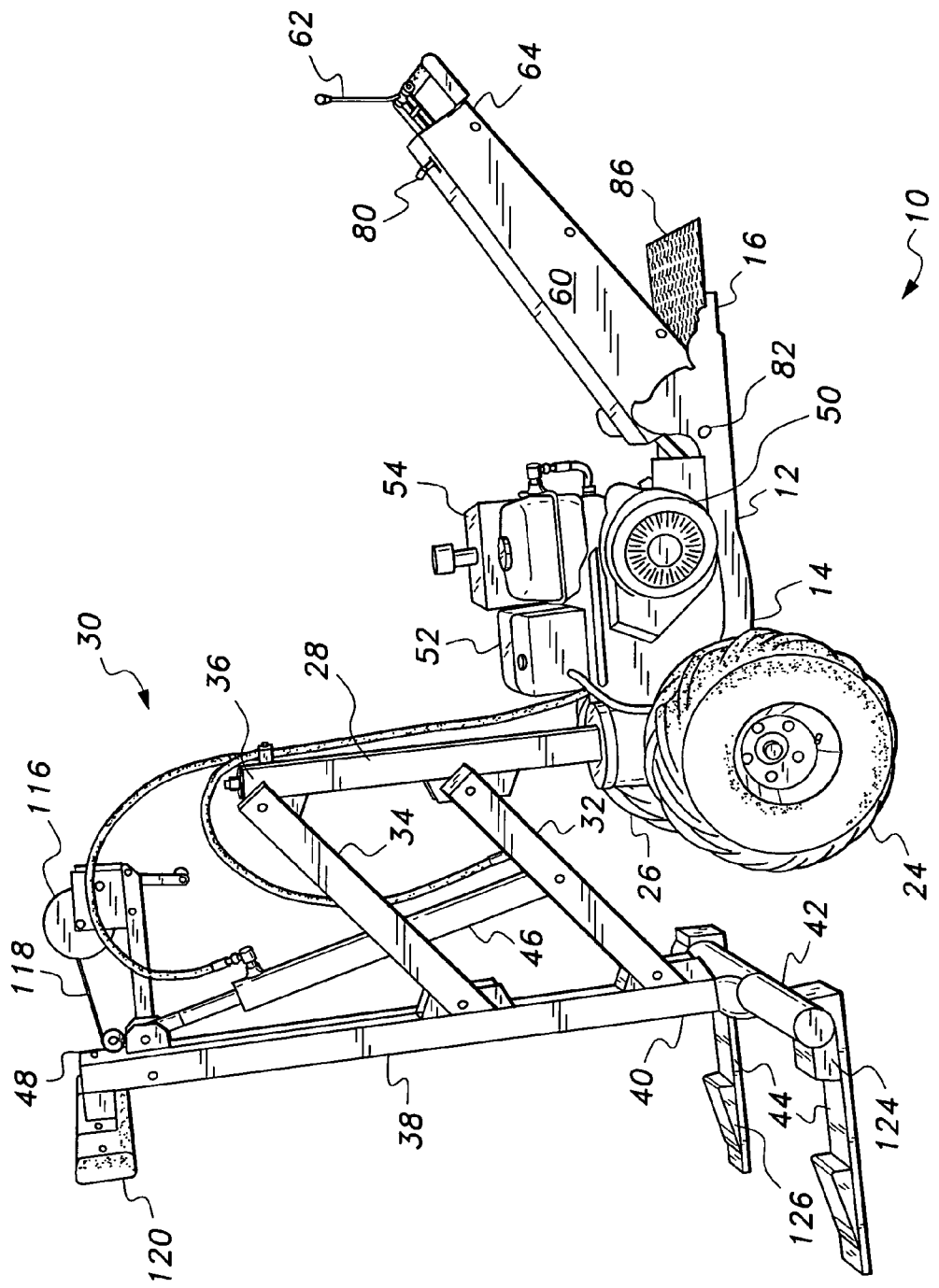
FIG. 1 is a perspective view of a first embodiment of a powered hand truck according to the present invention, showing its general configuration and features.

FIG. 1 of the drawings provides a left side perspective view of the powered hand truck 10, illustrating its general features. The hand truck 10 includes a chassis 12 having a support axle end 14 and an opposite operator end 16. A single axle 18 (shown most clearly in FIG. 4) extends laterally across the support axle end 14 of the chassis 12, with the remainder of the chassis (including the operator end 16) being cantilevered from the single support axle 18. The axle 18 has opposite first and second ends, respectively 20 and 22, with first and second drive wheels, respectively 24 and 26, installed upon the first and second axle ends 20 and 22. The axle 18 is pivotally attached to the axle end 14 of the chassis 12 about a longitudinal pivot axis to adjust for uneven terrain between the wheels and any load being carried. The suspension system for the single axle 18 is discussed in detail further below.

A forklift support column 28 extends upwardly from the axle end 14 of the chassis 12, with a forklift mechanism 30 extending from the forklift support column. The forklift mechanism 30 comprises a pantograph configuration, i.e., a series of pivotally attached parallel arms. A lower pair of forklift actuating arms 32 is pivotally attached to the medial portion of the support column 28, and an upper pair of actuating arms 34 is pivotally attached to the upper end 36 of the of the support column 28. The distal ends of the arm pairs or sets are pivotally attached to a forklift mast 38, with the lower arms 32 attaching at the lower end 40 of the mast 38 and the upper arms 34 attaching to the medial portion of the forklift mast 38. A fork attachment arm or bar 42 extends laterally across the lower end 40 of the mast 38, with a pair of fork tines 44 extending forwardly from opposite ends of the fork attachment arm 42.

Figure 2:
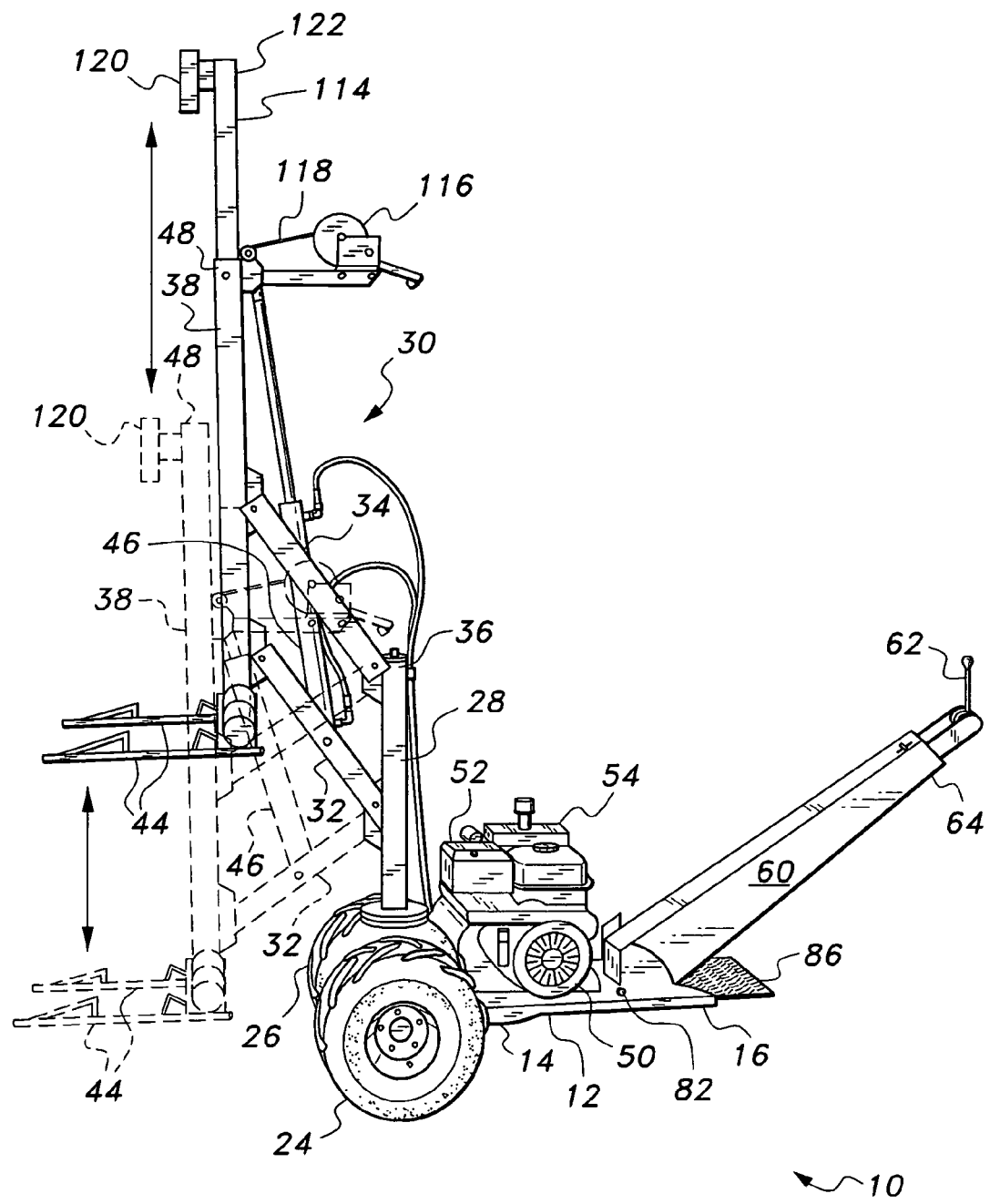
FIG. 2 is a perspective view of the powered hand truck of FIG. 1, showing the operation of the hydraulic lifting mechanism of the device.

The forklift mechanism is operated by a double acting hydraulic cylinder 46, which is pivotally secured at its lower end between the medial portions of the two lower forklift actuating arms 32, and at its upper end to the upper end 48 of the forklift mast 38. FIGS. 1 and 2 illustrate the operation of the hydraulic cylinder 46 and the resulting actuation of the forklift mechanism 30. In FIG. 1, the hydraulic cylinder 46 is shown in its retracted (shortest) configuration, with the distance between the medial portion of the lower forklift actuating arms 32 and the upper end 48 of the forklift mast 38 at its shortest span. This draws the distal ends of the lower and upper actuating arms 32 and 34 to their lowest positions, thereby placing the fork tines 44 at their lowest position. This configuration is also shown in broken lines in FIG. 2.

When hydraulic pressure is applied to the cylinder 46 to extend the cylinder, the upper end 48 of the forklift mast 38 is driven away from the medial portion of the lower actuating arms 32, thereby causing the arms 32 and 34 to move their distal ends upwardly with the mast 38, the fork tines 44 raising correspondingly. This is shown in solid lines in FIG. 2 of the drawings.

Figure 7:
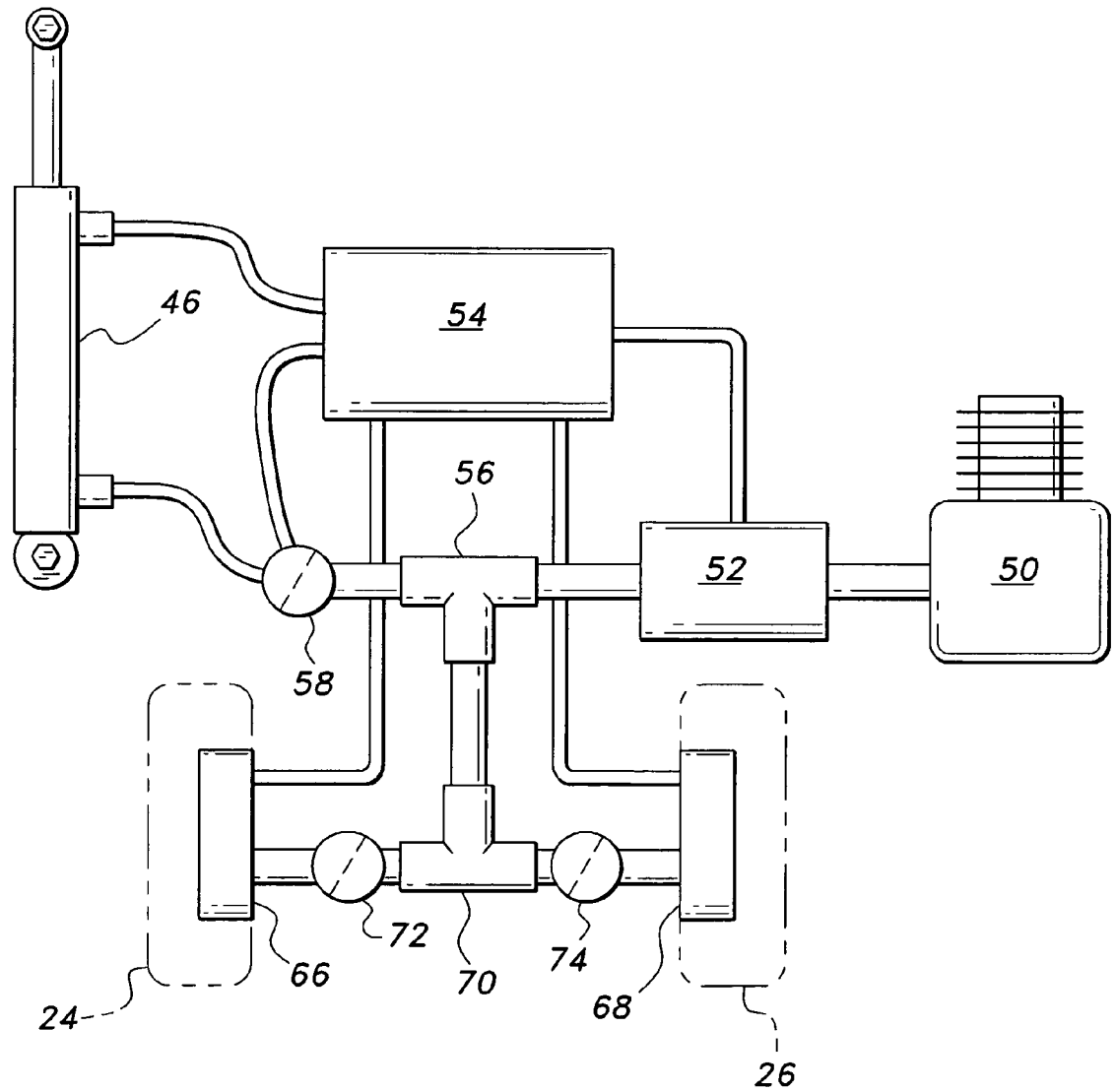
FIG. 7 is a pictorial schematic view of an exemplary hydraulic system for use with a powered hand truck according to the present invention.

FIG. 7 of the drawings provides a pictorial schematic drawing of an exemplary hydraulic system for powering the powered hand truck 10, with some of the components also being shown in other drawings. The hydraulic system is powered by a prime mover 50, e.g., an internal combustion engine, etc., installed generally medially upon the chassis 12. Alternatively, an electric motor may be used, drawing power from electrical storage batteries carried aboard the hand truck 10, or alternatively by grid power delivered by an electrical cord or line. The prime mover 50 in turn drives a hydraulic pump 52, which receives hydraulic fluid from a reservoir or tank 54. The pump 52 provides hydraulic fluid under pressure to the hydraulic lift cylinder 46 to actuate the forklift mechanism 30 and to drive the wheels 24 and 26 through a tee fitting 56 and control valve 58. An operator console 60 extends from the operator end 16 of the chassis 12, and includes a forklift cylinder control lever 62 extending from the distal end 64 of the console for control of the forklift cylinder control valve 58. Conventional pressure regulator and/or restrictor valves, etc. (not shown) may be provided in the hydraulic system, as required.

The first tee 56 also distributes hydraulic pressure to the left and right drive wheel hydraulic motors, respectively 66 and 68, contained within the respective left and right wheels 24 and 26, via a second tee fitting 70. Left and right drive wheel motor control valves, respectively 72 and 74, are controlled respectively by left and right twist grips 76 and 78, shown in FIG. 8, (or other control configuration, as desired) on the handlebar grip at the distal end 64 of the operator console 60. An engine throttle 80 may also be provided on the console 60, with the drive wheel hydraulic controls 76 and 78 and the throttle 80 being shown most clearly in FIGS. 8 and 9 of the drawings.

Figure 3:
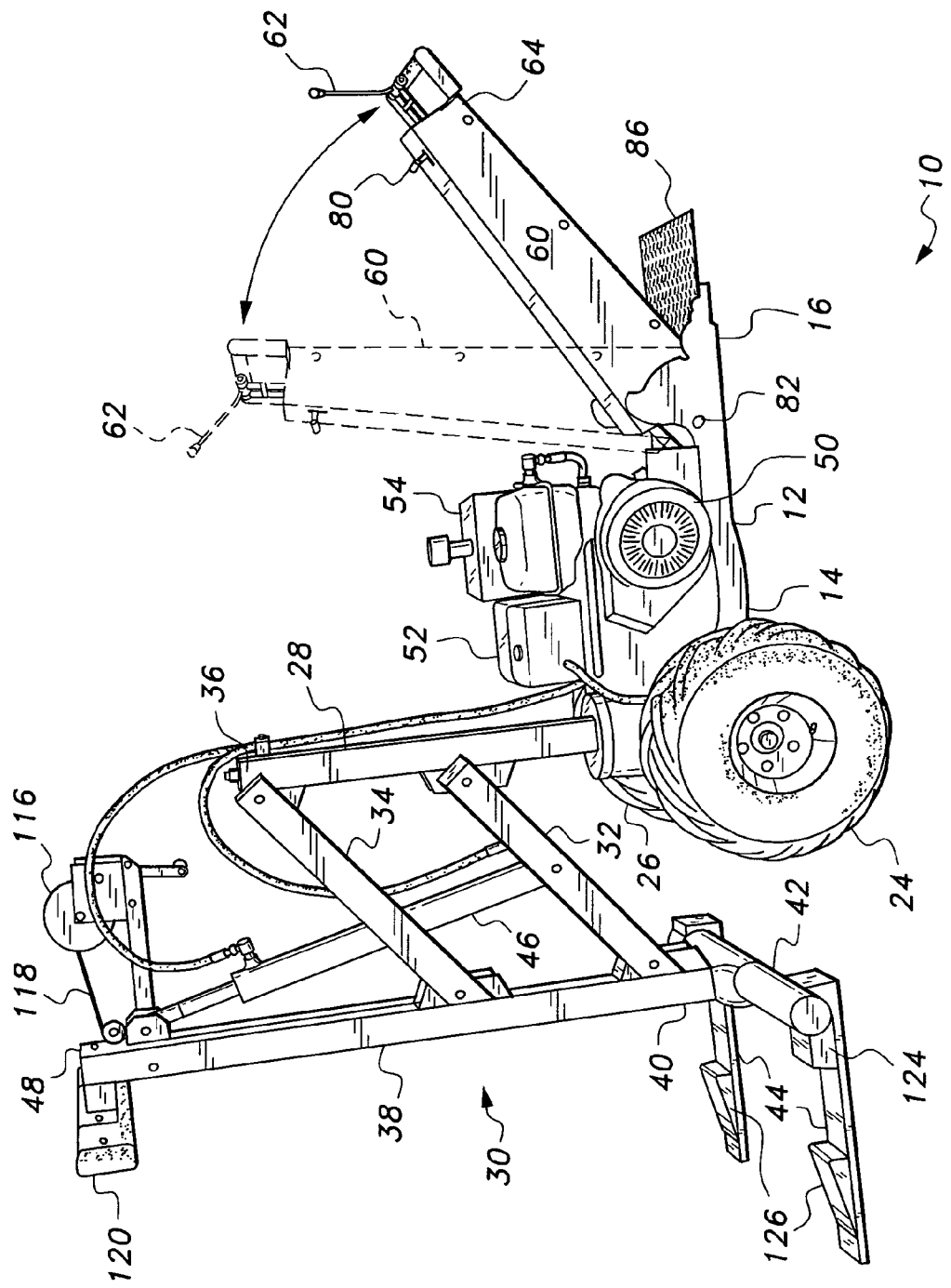
FIG. 3 is a perspective view of the powered hand truck of FIGS. 1 and 2, showing the articulation of the control console.

In the embodiment of FIGS. 1 through 3, 8, and 9, the console 60 is pivotally attached to the operator end 16 of the chassis 12 by a lateral console attachment pin or bolt 82, which allows the console 60 to articulate about the axis defined by the lateral bolt 82. A latch lever 84, shown most clearly in FIGS. 8 and 9 of the drawings, may be used to engage a dog-toothed sector gear within the base of the console 60 to lock the angular position of the console. FIG. 3 of the drawings illustrates the operator console 60 in its horizontally extended position in solid lines, and in its alternative substantially vertical orientation in broken lines. The console 60 may be adjusted at various intermediate angular positions as well. The articulation of the console 60 allows the height of the operator controls at the distal end 64 of the console to be positioned as desired by the operator, depending upon the location of the operator. An operator platform 86 is cantilevered from the extreme operator end 16 of the chassis 12, allowing the operator to stand upon the platform 86 to operate the powered hand truck 10 therefrom when the console 60 is raised. The operator may stand upon the ground or surface while operating the device when the console 60 is lowered.

Figure 4:
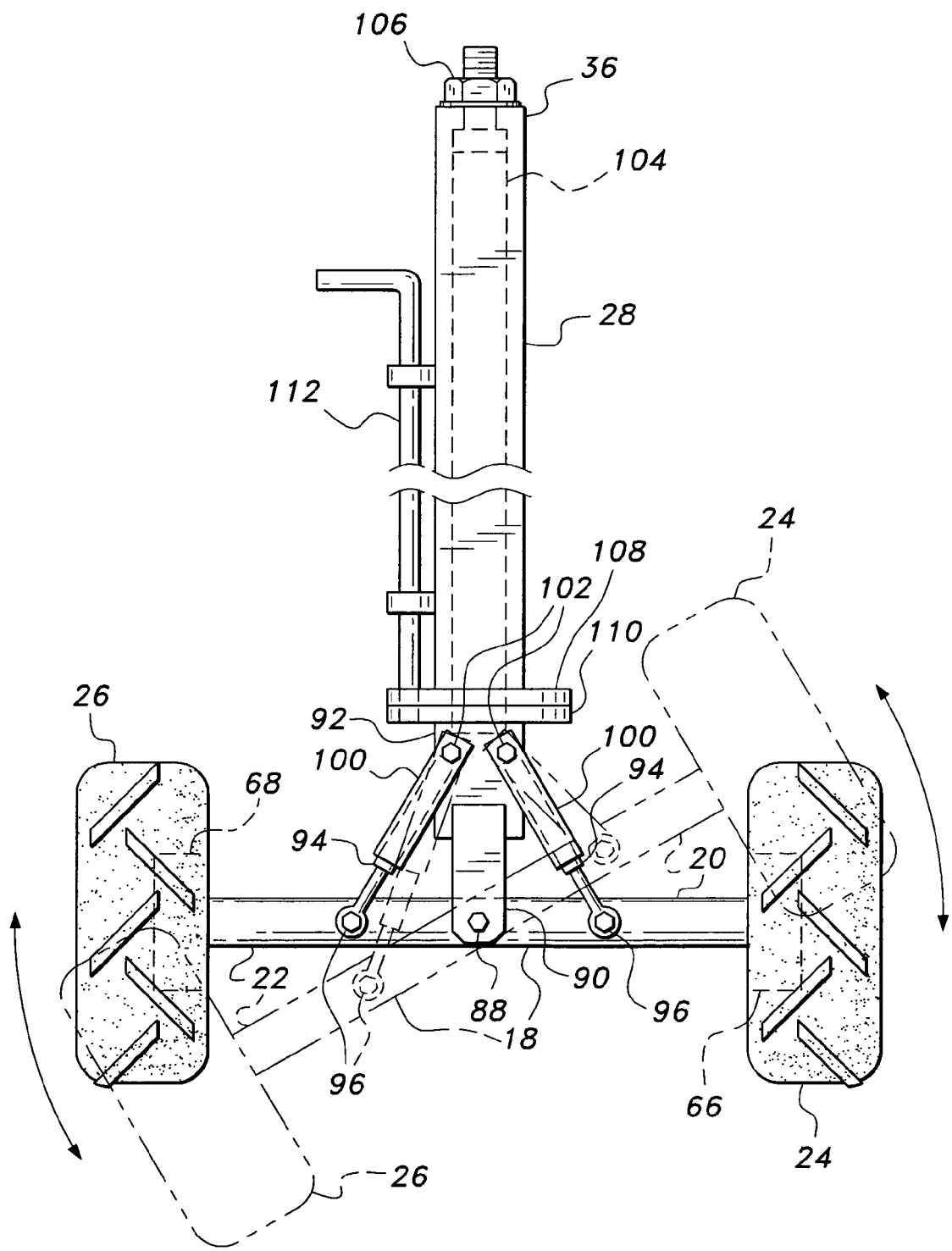
FIG. 4 is a front elevation view of the lift mechanism support column and drive axle of a powered hand truck according to the present invention, showing the drive axle suspension system.
Figure 5:
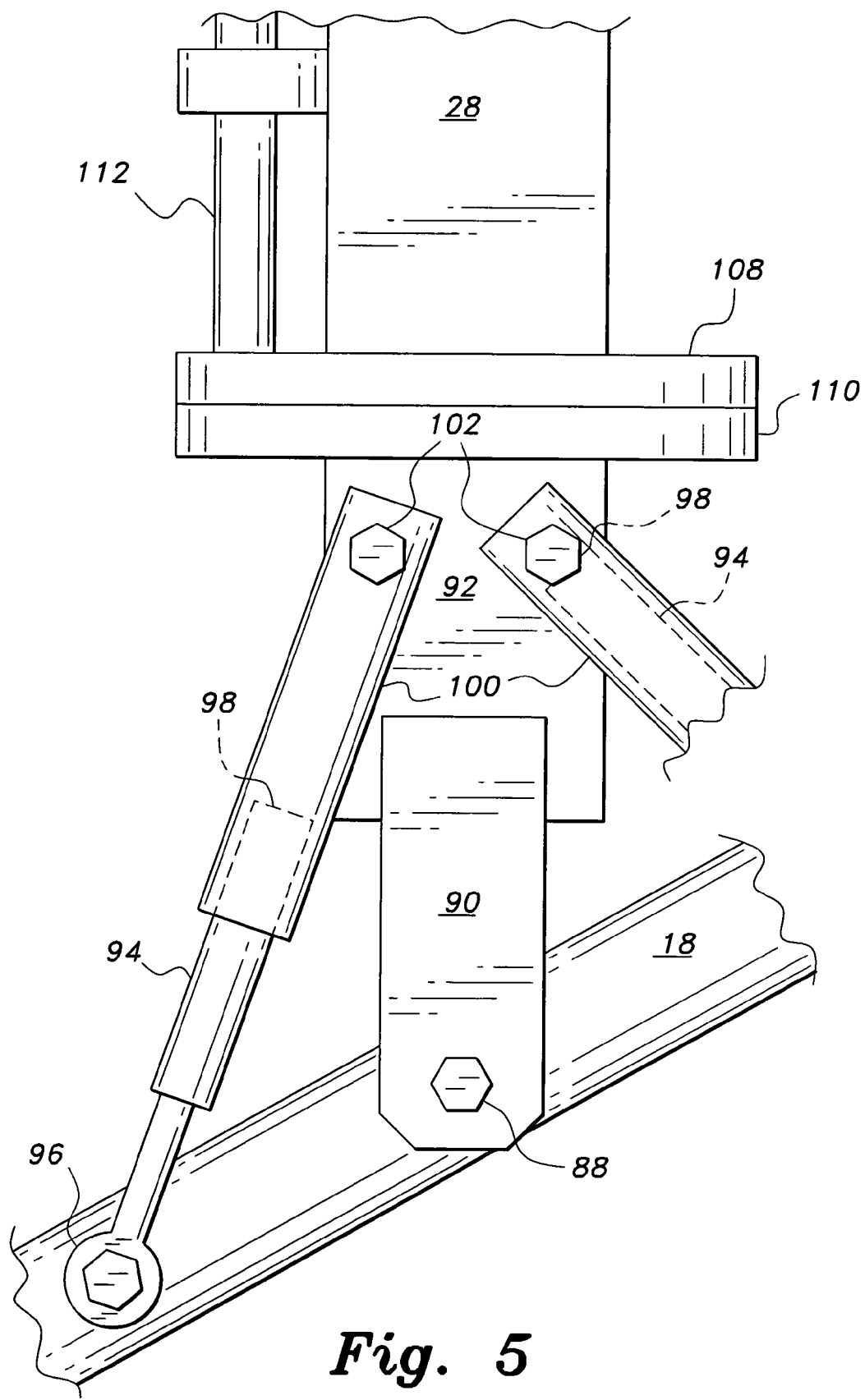
FIG. 5 is a detail view of the drive axle suspension system of FIG. 4, showing further details thereof.

The axle 18 to which the drive wheels 24, 26 and their respective drive motors 66, 68 are attached is pivotally secured to the chassis 12 in order to compensate for any uneven terrain over which the machine 10 is operated, while allowing the fork tines 44 to remain level with any load being supported. FIGS. 4 and 5 illustrate the articulation of the axle 18. A longitudinally disposed axle pivot bolt 88 extends through the center of the axle 18, pivotally securing the axle to an axle attachment bracket assembly 90, which, in turn, extends from the base 92 of the forklift support column 28. The forklift support column base 92, in turn, extends upwardly from the support axle end 14 of the chassis 12, as may be seen in FIG. 9 of the drawings.

Pivotal motion of the axle 18 is damped by first and second damper assemblies disposed to each side of the central axle pivot bolt 88. Each damper assembly comprises a pressurized element 94 (e.g., gas pressurized strut, with or without fluid damping, mechanical spring, etc.), having a lower end 96 pivotally connected to the axle 18. The upper ends 98 of the struts 94 are captured concentrically within respective first and second damper strut retaining tubes or sleeves 100, but the strut upper ends 98 are free to slide within the retaining tubes 100 and are not restricted in extension in their longitudinal movement within the tubes. The tubes 100, in turn, are pivotally secured to the forklift support column base 92 by first and second damper strut stop bolts 102, which define damper strut extension limits for the struts 94.

The lengths of the pressurized struts 94, and their attachment points to the axle 18 and the locations of the damper strut stop bolts 102, are selected to result in the upper ends 98 of the two struts 94 just contacting their respective stop bolts 102 when the axle 18 is horizontal, i.e., normal to the axis of the forklift support column 28. This results in the two struts 94 urging the axle 18 to a horizontal orientation, normal to the forklift support column 28, when pressures upon the two struts are equal. However, when the axle 18 is tilted relative to the remainder of the machine 10, as shown in broken lines in FIG. 4 and in the detail in FIG. 5, the upper end 98 of the strut 94 of the lower side of the axle pulls away from contact with its respective stop bolt 102, with the opposite strut applying greater pressure to its stop bolt. This urges the axle 18 back toward a horizontal orientation normal to the forklift support column 28, or conversely tends to align the machine with the orientation of the axle 18. The geometry of this arrangement, with the two strut free ends 98 just contacting their respective stop bolts 102 when the axle 18 is in its neutral position, results in an automatic centering reaction, which would not be the case if both struts were to apply pressure between the axle 18 and forklift support column base 92 when the axle was tilted relative to the support column 28 and remainder of the structure.

Figure 6:
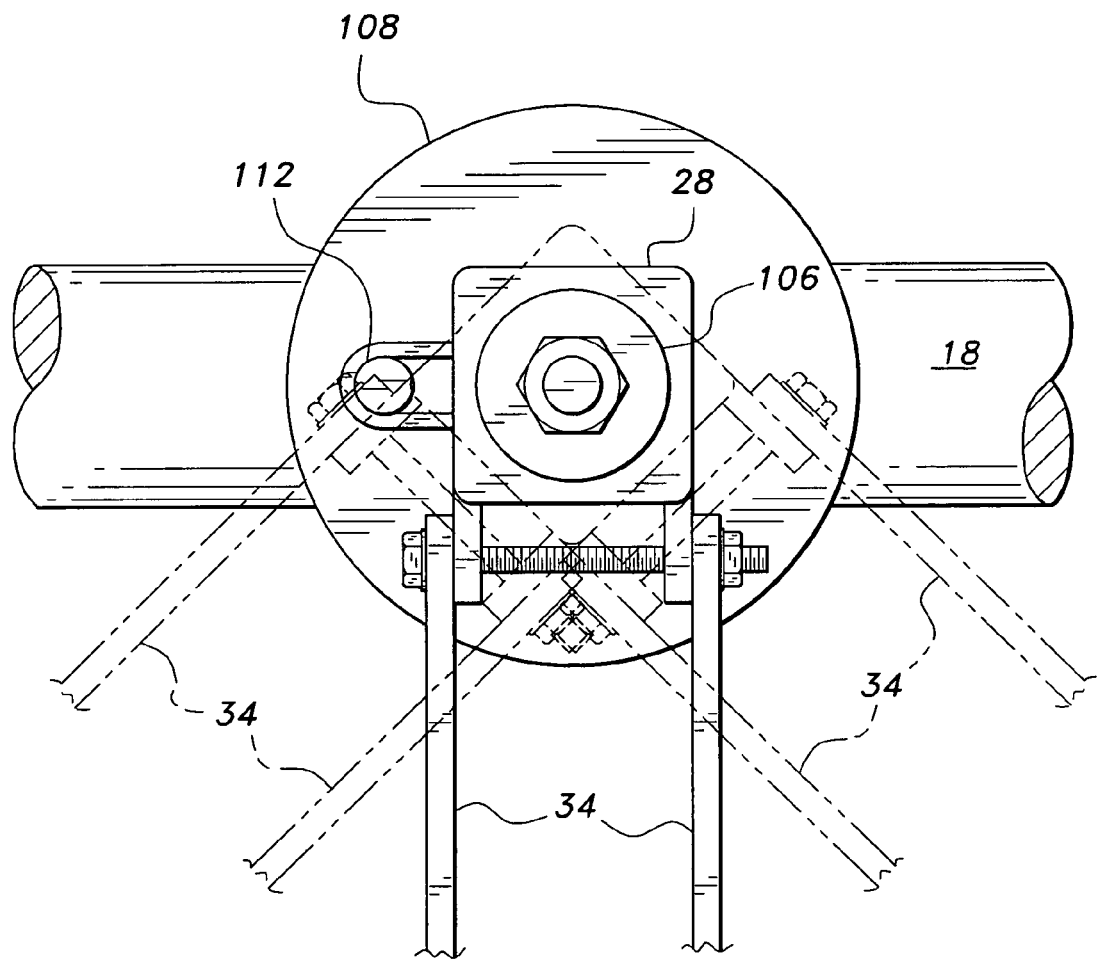
FIG. 6 is a detailed top plan view of the lift mechanism support column of FIG. 4, showing the pivotal attachment of the hydraulic lift mechanism thereon.

FIGS. 4 and 5, along with FIG. 6, also illustrate the pivotal attachment of the forklift support column 28 to its base 92 in the first embodiment of the machine. The column 28 includes a relatively stationary, i.e., non-rotating, core 104, which passes concentrically through the outer column 28. The column 28 is captured upon the core 104 by a retaining nut and washer assembly 106, or other suitable means, installed atop the core 104. The column 28 includes a relatively wide base flange 108, which rotates atop a stationary column support flange 110, which is, in turn, disposed atop the column base 92. The column support flange 110 includes a series of holes or passages therethrough, with a latch rod 112 extending downwardly along the support column 28 and through a hole or passage in the column base flange 108 to selectively engage one of the holes in the support flange 110. Thus, the operator of the machine 10 may adjust the angle of the forklift mechanism 30 and its fork tines 44 about the axis of the support column 28 for maneuvering in limited areas, or for other reasons as desired. The outward movement of the forklift mast 38, and its fork tines 44, at the generally medial lift position of the forklift mechanism provides clearance from the wheels and tires of the machine when the forklift mechanism 30 is pivoted about its support column 28, or, conversely, when the machine is pivotally maneuvered about a load supported by the fork tines and forklift mechanism.

Figure 8:
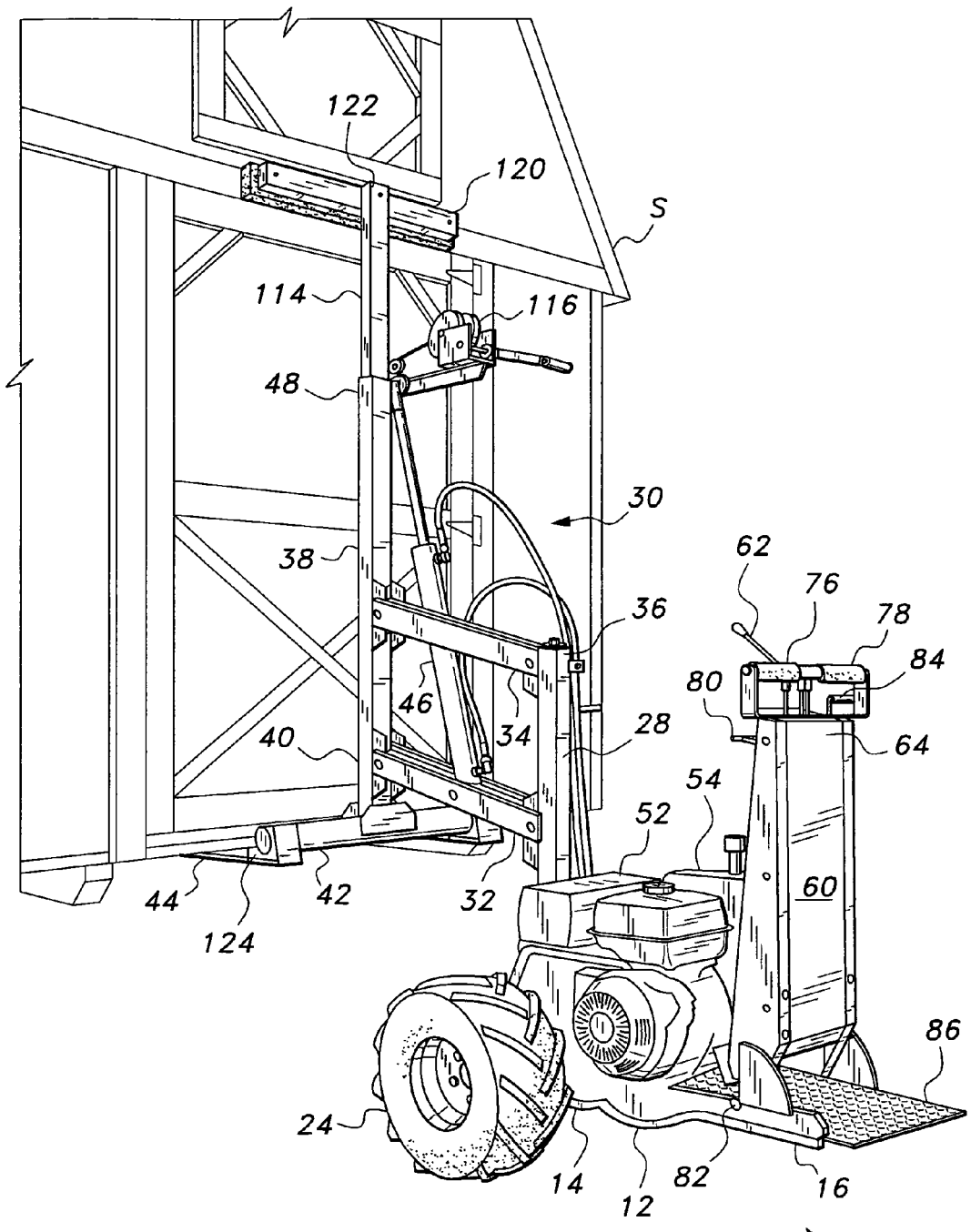
FIG. 8 is an environmental rear perspective view of the powered hand truck of FIGS. 1 through 3 in use, lifting and transporting a portable building structure.
Figure 9:
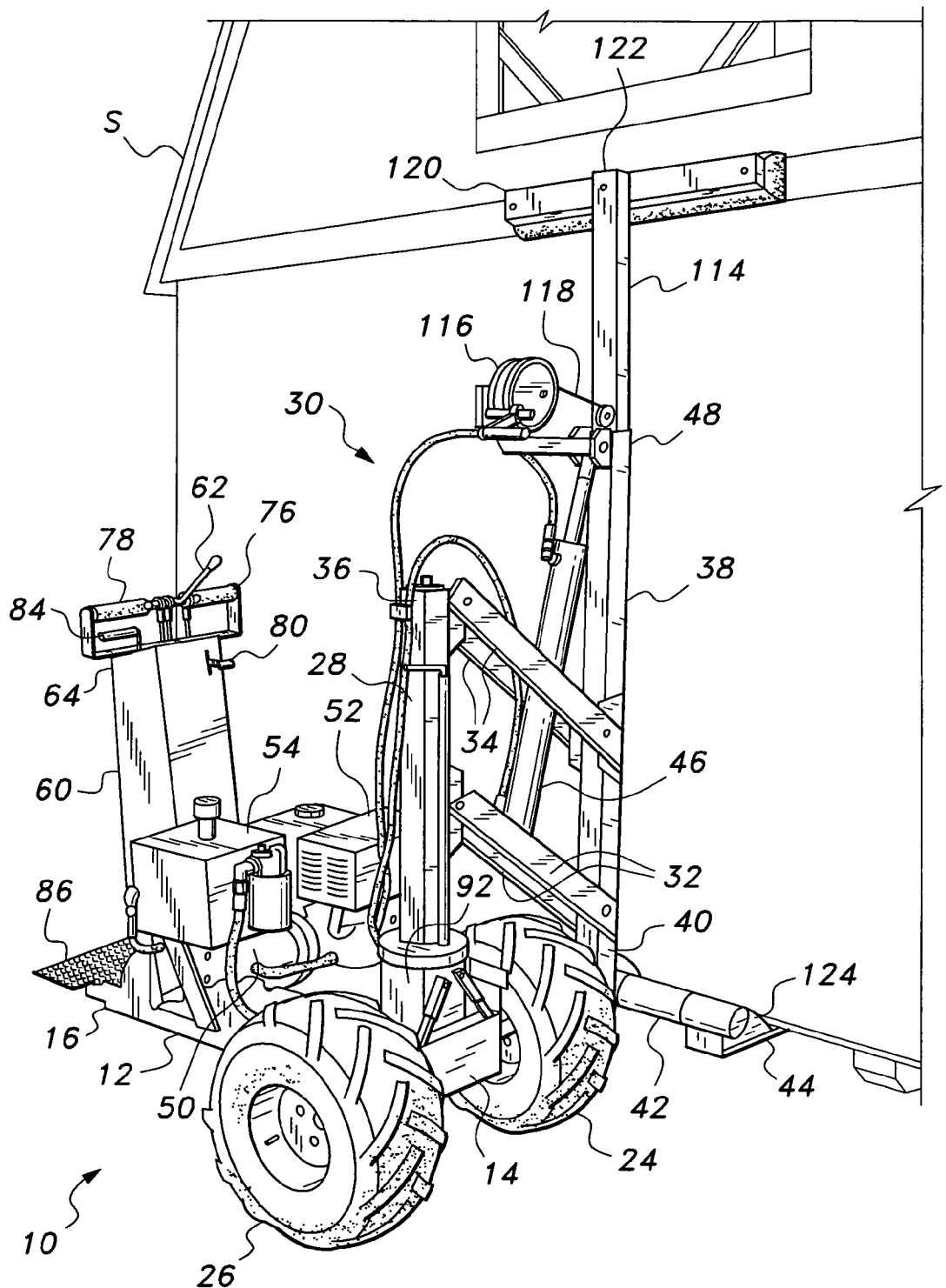
FIG. 9 is an environmental front perspective view of the powered hand truck of FIG. 8 in use, showing the lifting mechanism pivoted to the left for lifting a portable structure.

Additional versatility is provided by a telescoping forklift mast extension, which extends from the forklift mast 38, as shown in FIGS. 2, 8, and 9. The mast extension 114 telescopes concentrically within the forklift mast 38, and may be raised by means of a winch 116 disposed at the upper end 48 of the mast 38 and connected to the lower end of the extension 114 by a cable 118 which runs down the interior of the mast 38 to the base of the extension 114. The upper end of the extension 114 includes an upper end clearance standoff 120, which extends generally laterally across the upper end 122 of the forklift mast extension 114. This standoff 120, along with a lower end clearance standoff 124 disposed upon each of the fork tines 44, limits the approach of the machine 10 and its forklift mast 38 to the face of a structure. The clearance standoffs 120 and 124 contact the face of the structure at its upper portion and lower edge, thereby providing clearance between the forklift mast 38 (and its extension 114, if raised) and any protruding hardware or other components extending from the face of the structure being moved by the powered hand truck 10.

Figure 10:
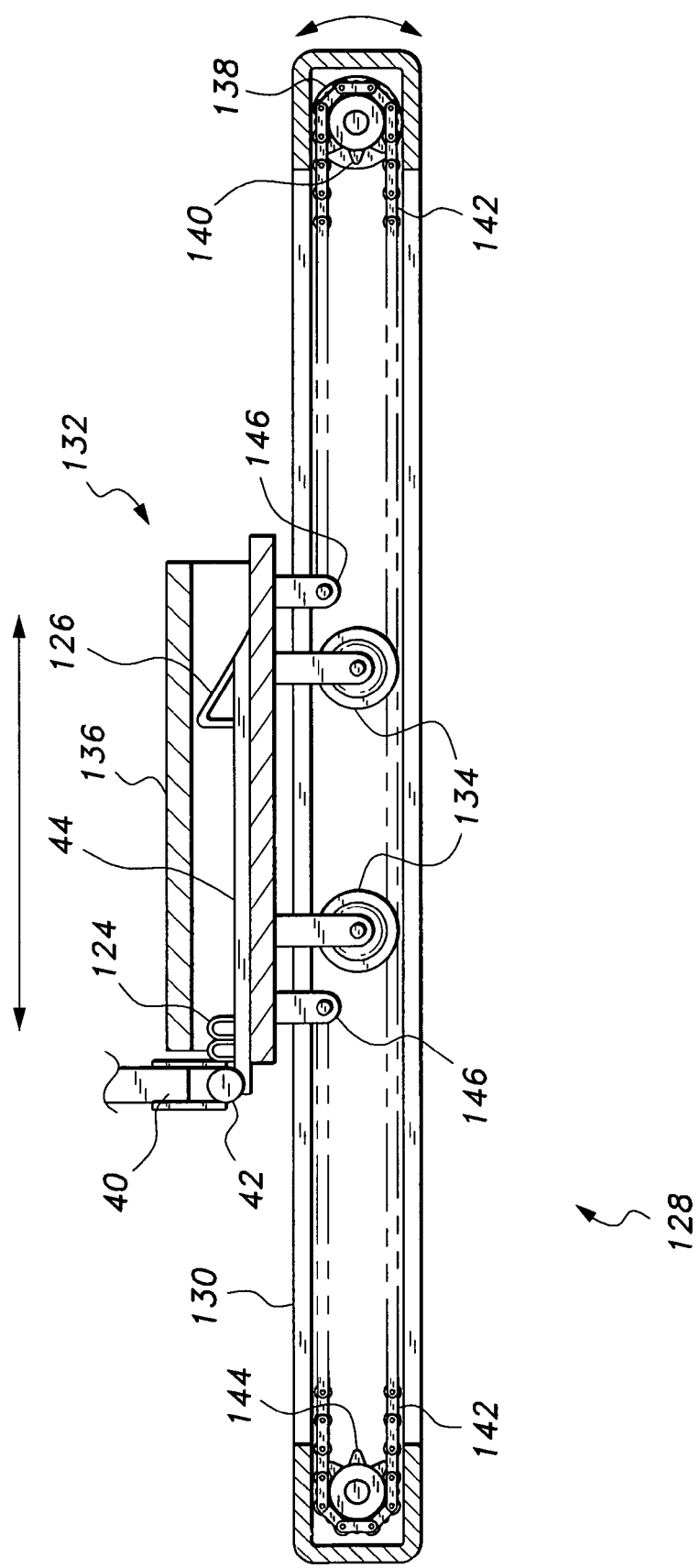
FIG. 10 is a side elevation in section of a mobile storage rack assembly for use with a powered hand truck according to the present invention.

FIGS. 8 and 9 illustrate the operation of the first embodiment powered hand truck 10 in the movement of a portable structure S, e.g., a small storage building, etc. Such portable structures S are generally constructed atop two or more skids, which raise the floor of the structure above the underlying surface. This also provides a space or gap between the floor and the underlying surface for the insertion of a lifting device, e.g., the forklift tines 44 of the present machine. Initially, one end of the structure S is raised for placement of a dolly or other suitable support therebeneath, by means of the powered hand truck 10 or other means as desired. The powered hand truck 10 is then driven to position the forklift tines 44 beneath the floor of the building or structure S opposite the end previously supported by the dolly, and advanced until the stops or clearance standoffs 120 and 124 contact the surface of the structure. The forklift mast extension 114 may be raised to position the upper standoff 120 above any relatively weaker structural components, e.g., doorways, etc., generally as shown in FIG. 9. The two tines 44 include catches 126 at their distal ends, as shown in FIGS. 1, 3, and 10, which catch beneath the edge of any doubler or sole plate beneath the floor of the portable structure S. This assures that the structure S cannot slip from the tines 44 as the machine 10 pulls the structure S across the surface. In FIG. 9, the forklift support column 28 is shown unlocked from its normal straight ahead position to allow the remainder of the machine to be pivoted relative to the structure S while the forklift mechanism 30 and fork tines 44 remain normal to the building structure. This greatly improves the maneuverability and versatility of the machine 10.

Figure 11:
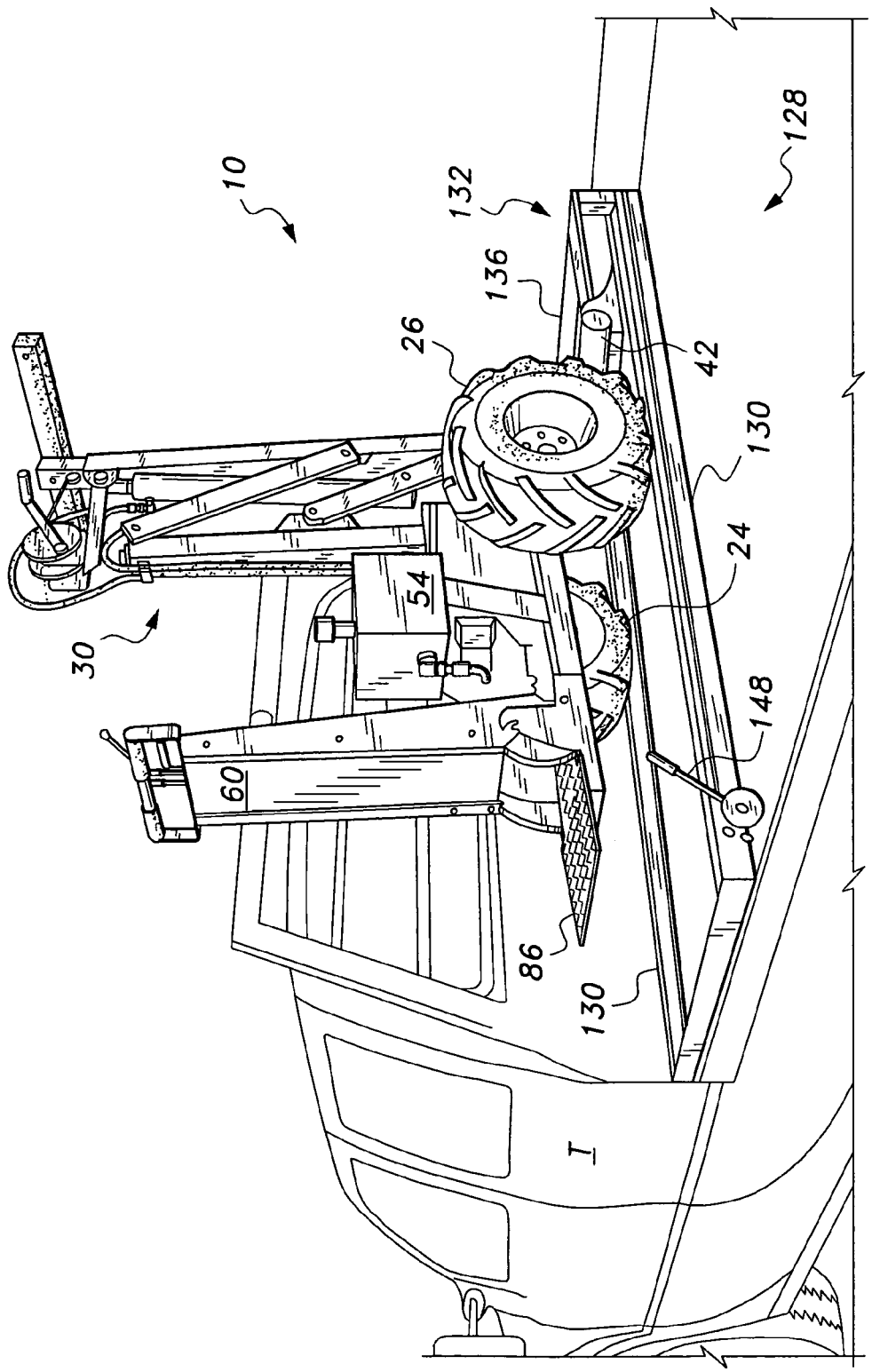
FIG. 11 is an environmental perspective view of a powered hand truck of the present invention in a stored configuration upon the mobile storage rack, which is, in turn, mounted atop the bed of a flatbed truck vehicle.
Figure 12:
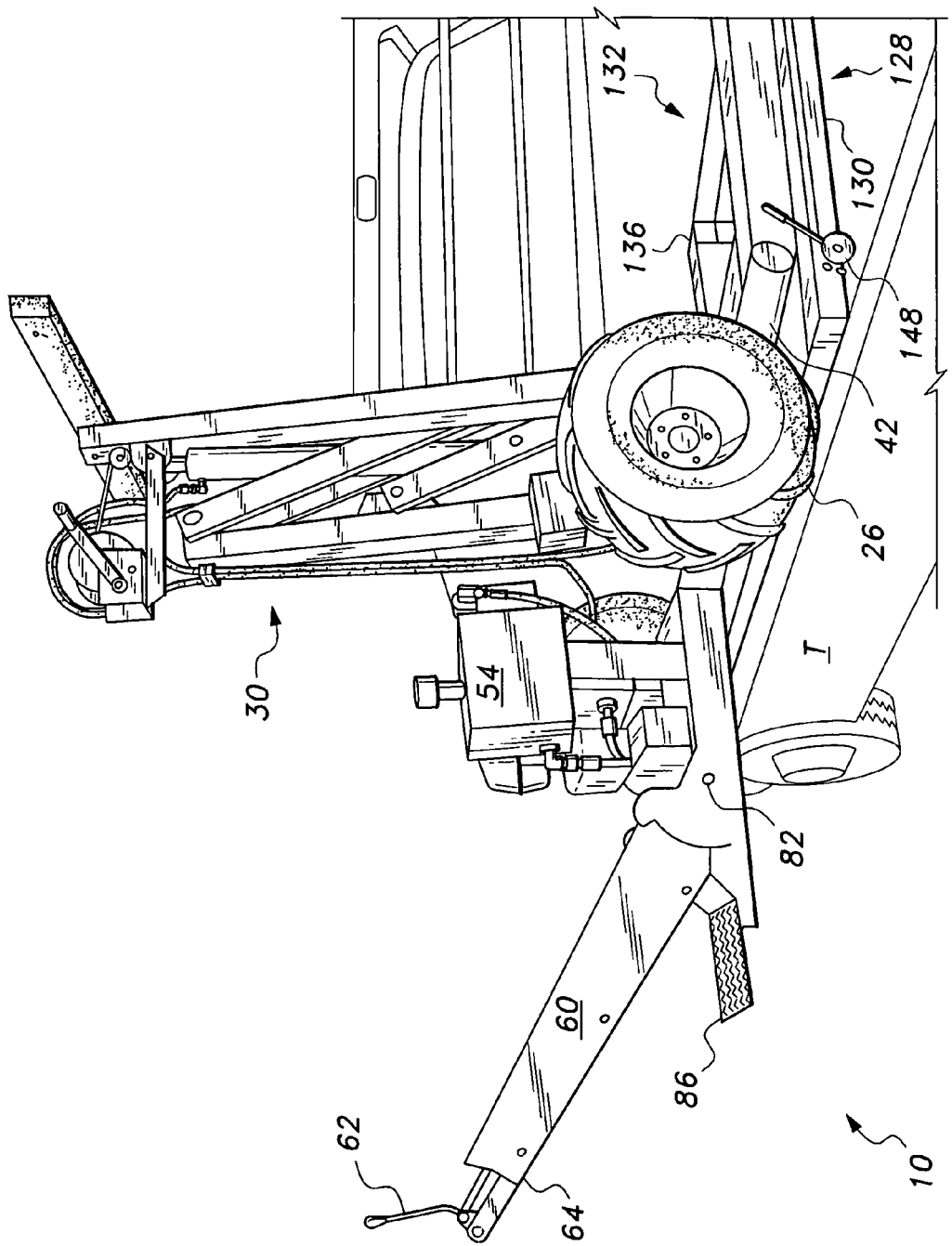
FIG. 12 is an environmental perspective view showing the initial step in removing the powered hand truck of FIG. 11 from its storage rack, or a secondary step in docking the powered hand truck with the rack.
Figure 13:
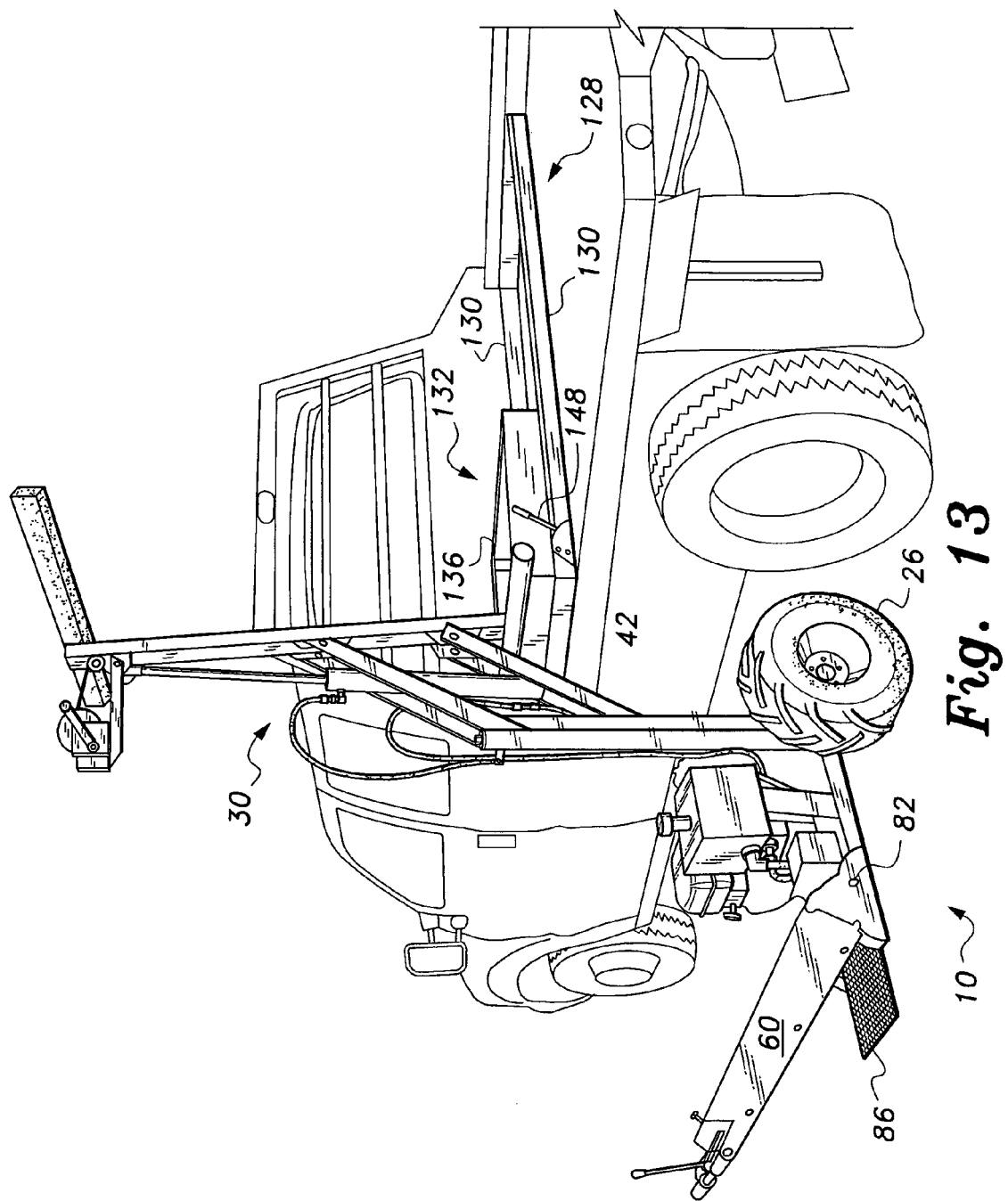
FIG. 13 is an environmental perspective view showing the final step in removing the powered hand truck of FIG. 11 from its storage rack, or the initial step in docking the powered hand truck with its rack.

FIG. 10 provides a cross-sectional view of a storage rack 128 for use in storing the powered hand truck 10, with FIGS. 11 through 13 illustrating the operation and use of the storage rack. The rack 128 has a pair of parallel, opposed tracks 130, each comprising a generally rectangular, C-shaped cross section with the open sides facing one another. The opposite ends of the tracks 130 are closed by similarly shaped components, forming a rectangular frame.

A forklift-engaging dolly 132 rides back and forth in the tracks 130, with the dolly having four wheels 134. Two of the wheels ride within the C-channel of the first track, with the other two wheels riding within the C-channel of the opposite second track. FIG. 10 provides an internal view of a single track 130, showing two of the wheels 134 on one side of the dolly 132 riding in that single track. The dolly wheels 134 depend from a single fork tine capture box 136, which comprises the body of the dolly 132.

Movement of the dolly may be motorized, if so desired. In the example illustrated in FIG. 10, an electric motor 138 is disposed within one channel end of the storage rack 128, with the motor selectively driving a chain sprocket 140 generally centrally disposed between the two tracks 130. A roller chain 142 runs around the motor drive chain sprocket 140 to an opposite idler sprocket 144 at the opposite end of the storage rack 128, and connects to opposite lugs 146 depending from each end of the dolly 132. The motor 138 is preferably a twelve-volt electric motor receiving power from the conventional twelve-volt electrical system of the vehicle (e.g., light flatbed truck T, as shown in FIGS. 11 through 13, or other vehicle as desired). A motor control switch 148 is preferably placed at some convenient location adjacent the dispensing and receiving end of the storage rack 128, as shown in FIGS. 11 through 13, precluding need for the operator to climb aboard the truck T and allowing the operator to closely monitor the operation while actuating the switch 148. The electrical system for the motor 138 is reversible using conventional circuitry, and preferably conventional limit switches are provided to stop the motor automatically when the dolly 132 reaches either end of the storage rack 128.

FIGS. 11 through 13 illustrate the operation of the storage rack 128 and its dolly 132 for removing the powered hand truck 10 from storage on the back of the truck T. In FIG. 11, the powered hand truck 10, storage rack 128, and dolly 132 are shown in the configuration for storing the hand truck 10 upon the storage rack 128, which is, in turn, installed upon the back of a flatbed truck T or other suitable vehicle. The fork tines 44 of the powered hand truck 10 are captured within the tine capture box 136 of the dolly 132, as shown in FIG. 10, and the dolly 132 has been translated all the way to the opposite side of the truck T from the dispensing and receiving end of the storage rack 128. The remainder of the powered hand truck 10 is lifted above the fork tines 44, in order that the wheels and tires 24 and 26 will clear the underlying tracks 130 of the storage rack 128 when placed thereon. This is accomplished by operating the hand truck 10 to initially capture the fork tines 44 within the fork tine capture box 136, and then actuating the lift cylinder control lever 62 to lower the fork tines 44 relative to the rest of the hand truck 10. With the fork tines 44 captured within the box 136, this has the effect of lifting the entire powered hand truck 10 relative to the tines 44 to a point above the tines 44. This allows the dolly 132 to be translated along the tracks 130 without having any of the structure of the powered hand truck 10 interfering with the storage rack 128.

The dolly 132 has been translated to the dispensing and receiving end of the storage rack 128 in the intermediate unloading step shown in FIG. 12. The powered hand truck 10 is suspended above the underlying surface, beyond the side of the truck T, due to the fork tines 44 still being captured within the capture box 136 of the dolly 132. At this point, the operator can reach up to the distal end 64 of the operator console 60 (which has been lowered about its pivot 82 in FIG. 12, for convenient access) and operate the lift cylinder control lever 62 to raise the fork tines 44 relative to the remainder of the hand truck 10. The alternative embodiment of FIGS. 14 and 15 allows the operator to stand upon the operator platform during this operation. As the tines 44 are captured within the fork tine capture box 136, this has the effect of lowering the hand truck 10 to the surface alongside the truck T, generally as shown in FIG. 13. The powered hand truck 10 need not be running in order to accomplish this step of lowering the hand truck to the surface, as operation of the control valve will allow hydraulic pressure to bleed down from the system when the hydraulic system is not pressurized.

Once the powered hand truck 10 has been lowered to the surface, as shown in FIG. 13, it may be started and driven clear of its storage rack 128 and the truck T (or other vehicle) upon which the storage rack is mounted. The powered hand truck 10 may then be used as described further above and illustrated in FIGS. 8 and 9. When the task involving the powered hand truck 10 has been completed, it may be loaded back onto its storage rack 128 by reversing the process illustrated in FIGS. 11 through 13, with the only basic difference being that the powered hand truck 10 must be running in order to power the hydraulic system. This allows the weight of the hand truck 10 to be lifted by the fork tines 44 captured within the fork tine capture box 136 of the dolly 132. The dolly 132 is then translated along the length of the tracks 130 to position the powered hand truck 10 over the structure of the truck T, to complete the task of storing the hand truck 10.

Figure 14:
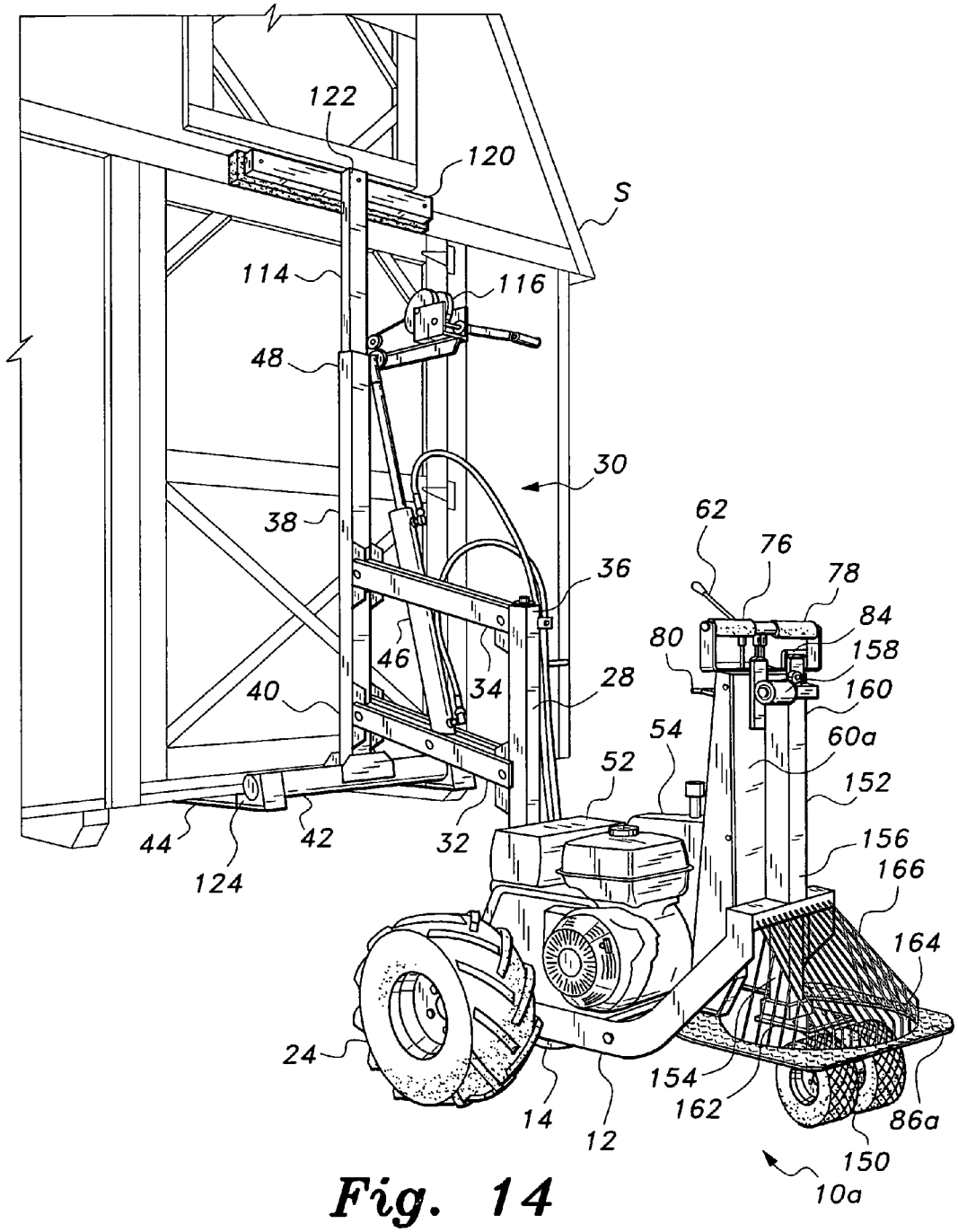
FIG. 14 is an environmental rear perspective view similar to that of FIG. 8, illustrating a second embodiment of a powered hand truck according to the present invention with additional castering wheels for support of the operator end of the machine.
Figure 15:
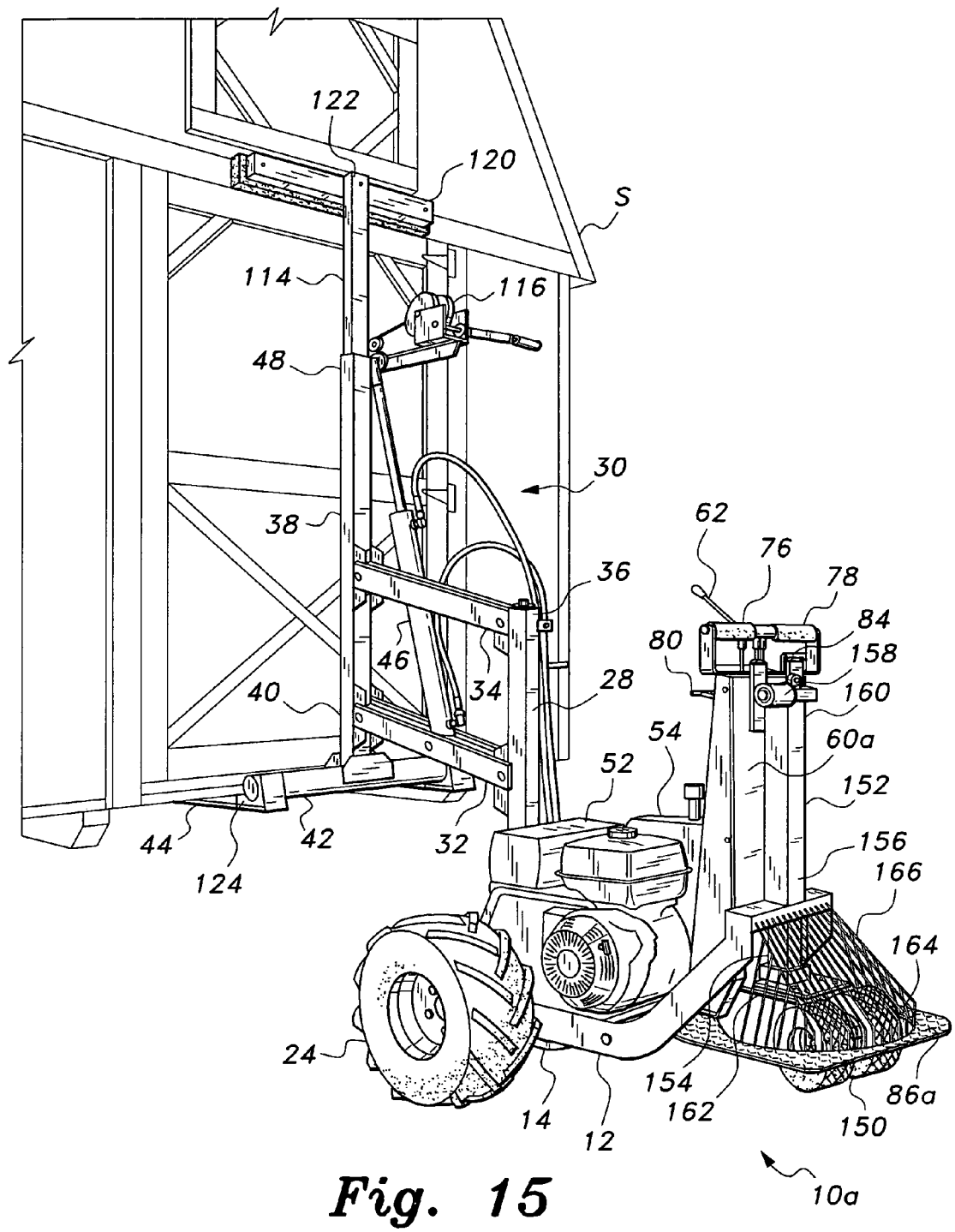
FIG. 15 is an environmental rear perspective view of the powered hand truck of FIG. 14, but showing the castering wheels in a retracted state.

FIGS. 14 and 15 illustrate another embodiment of the powered hand truck, designated as 10a in FIGS. 14 and 15. The powered hand truck 10a of FIGS. 14 and 15 is substantially similar to the powered hand truck 10 of FIGS. 1 through 9 and 11 through 13, with the primary exception of the additional castering wheel or wheels 150 installed at the operator end of the machine, along with the actuating mechanism for extending and retracting the wheel(s) 150. The caster wheel(s) 150 enable the operator to stand upon the operator platform 86a of the machine 10a when the device is not counterbalanced by the weight of a load being carried by the forklift mechanism 30, rather than having to walk behind the machine 10 when the truck 10a is being conveyed from one site to another to pick up a load.

The caster wheel or wheels 150 may be selectively retracted during load lifting and moving operations, in order to remove any support that might otherwise reduce the load and traction provided to the main or drive wheels 24 and 26. This is accomplished by a caster wheel actuation strut housing 152, installed to and extending downwardly along the operator console 60a. (The operator console 60a is fixed relative to the chassis 12 of the machine 10a, and does not articulate as does the console 60 of the first powered hand truck 10.) A caster wheel actuation strut 154 extends telescopically from the lower end 156 of the housing 152, with the strut 154 being driven extensibly and retractably from and into the housing 152 by an actuation strut drive motor 158 installed upon the operator console 60a at the upper end 160 of the housing 152. The motor 158 receives electrical power from the same source as other electrically actuated components of the hand truck 10a, and may be operated by a conventional double toggle switch (not shown) to reverse motor operation for extension and retraction of the wheel(s) 150. The drive motor 158 may turn a conventional screw jack (not shown), which engages a cooperatively threaded fitting on the actuation strut 154 within the housing 152. Other wheel extension and retraction means may be used, e.g., conventional hydraulic strut as used in other portions of the hand truck 10a, etc.

A caster wheel attachment bracket or fitting 162 extends from the lower end of the actuation strut 154, with the caster wheel(s) 150 being pivotally secured to the attachment 162 and axially offset from the axis of the actuation strut 154 in order to allow the wheel(s) to caster freely. Clearance for the wheel(s) 150 is provided by a caster wheel clearance opening 164 through the operator platform 86a. A guard 166 (rigid wire or rod, expanded or solid sheet metal, etc.) is installed about the wheel clearance opening 164 of the operator platform 86a, in order to prevent the operator from inadvertently stepping into the opening 164.

The powered hand truck 10a of FIGS. 14 and 15 permits the operator to stand atop the platform 86a and operate the machine while riding atop the platform when there is no load on the forklift mechanism 30, as the wheel(s) 150 may be extended as shown in FIG. 14 to support the weight of the operator at that end of the machine. When the powered hand truck 10a is positioned to lift a load (e.g., portable building structure S, as shown in FIGS. 14 and 15), the caster wheel(s) 150 are retracted to the general position shown in FIG. 15 in order for the wheels 150 to remain clear of the underlying surface. This assures that all of the weight of the powered hand truck 10a, along with the weight of the operator and a substantial portion of the weight of the structure S, is applied directly to the two main drive wheels 24 and 26 for optimum traction. The operator may continue to stand atop the platform 86a during the transport operation, as the weight of the structure S on the forklift mechanism 30 overbalances the weight of the operator on the platform 86a, as in the operation of the powered hand truck 10.

FIGS. 16 through 21 illustrate a further embodiment of the powered hand truck, designated as powered hand truck 210 in the drawings. The powered hand truck 210 differs from other embodiments described herein by preferably having a remote control system (e.g., radio, infrared, cable, etc.) with a control unit or transmitter operated by an operator physically removed from the powered hand truck 210. The powered hand truck 210 differs in certain other respects from other embodiments described herein, but may incorporate any of the structure of those other embodiments, or alternatively those other embodiments may incorporate the remote control system of the powered hand truck 210, and any of its other features as well.

Figure 19:
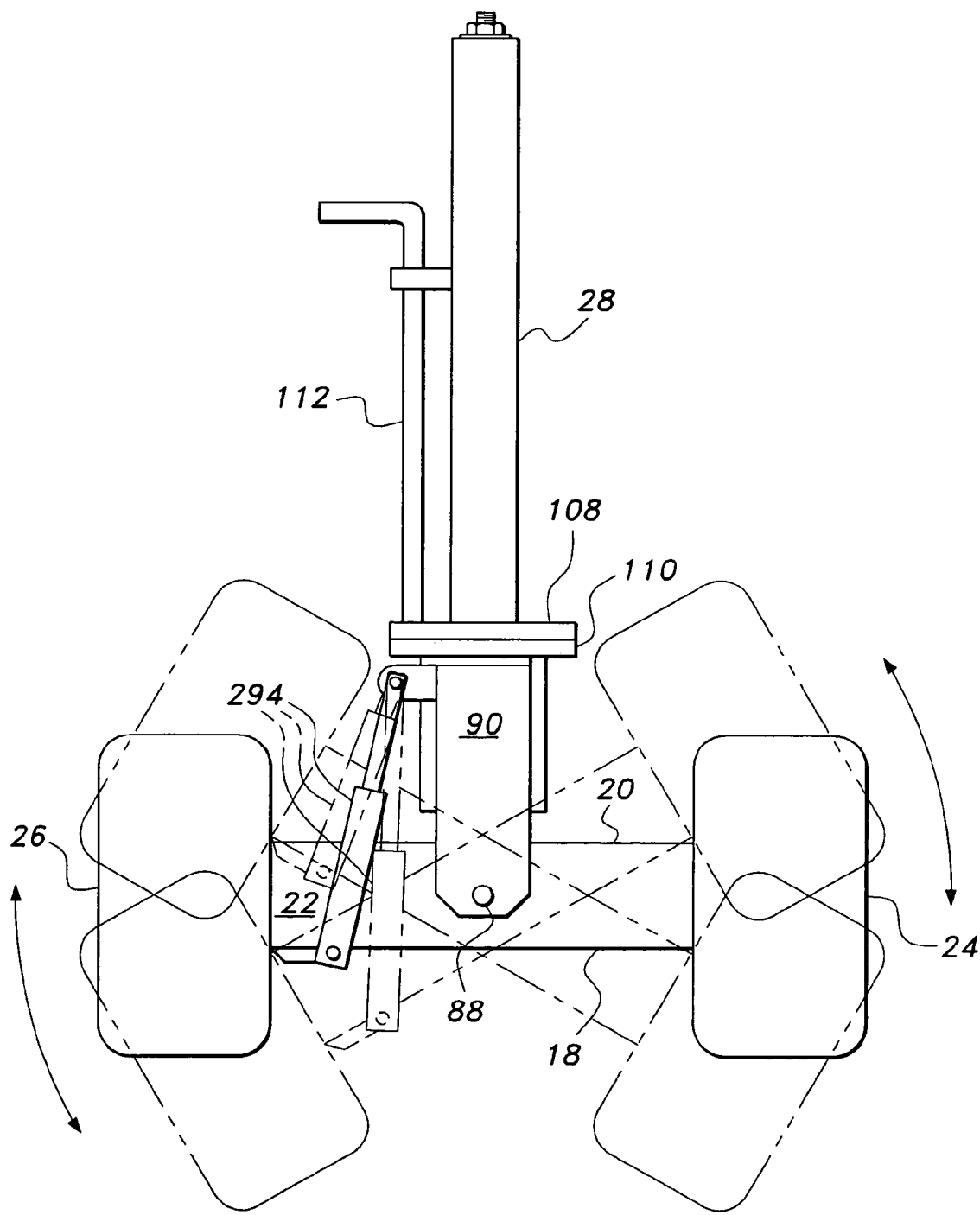
FIG. 19 is a front schematic view of an alternative embodiment of an axle tilt control system for a powered hand truck according to the present invention.

The powered hand truck 210 includes a rigid, unitary chassis 212 having a support axle end 214 and an opposite caster wheel end 216. A single axle 18 (as shown in FIG. 4) extends laterally across the support axle end 214 of the chassis 212. The axle 18 has opposite first and second ends, respectively 20 and 22 as shown in FIGS. 4 and 19, with first and second drive wheels, respectively 24 and 26, installed upon the first and second axle ends 20 and 22. The axle 18 is pivotally attached to the axle end 14 of the chassis 12 about a longitudinal pivot axis to adjust for uneven terrain between the wheels and any load being carried. The suspension system for the single axle 18 of the powered hand truck 212 is discussed in detail further below.

A forklift support column 28 extends upwardly from the axle end 14 of the chassis 12, with a forklift mechanism 30 extending from the forklift support column. The forklift support column 28 extends upwardly from its column base flange 108, which is pivotally mounted atop a fixed column support flange 110. The rotational position of the forklift support column 28 may be locked or latched in place by the column latch rod 112, as in the case of the earlier described embodiments. The remainder of this forklift mechanism 30 is identical to the forklift mechanism 30 illustrated in FIGS. 1 through 15 and described further above for the powered hand truck embodiments 10 and 10a, and consequently need not be described further here.

Figure 20:
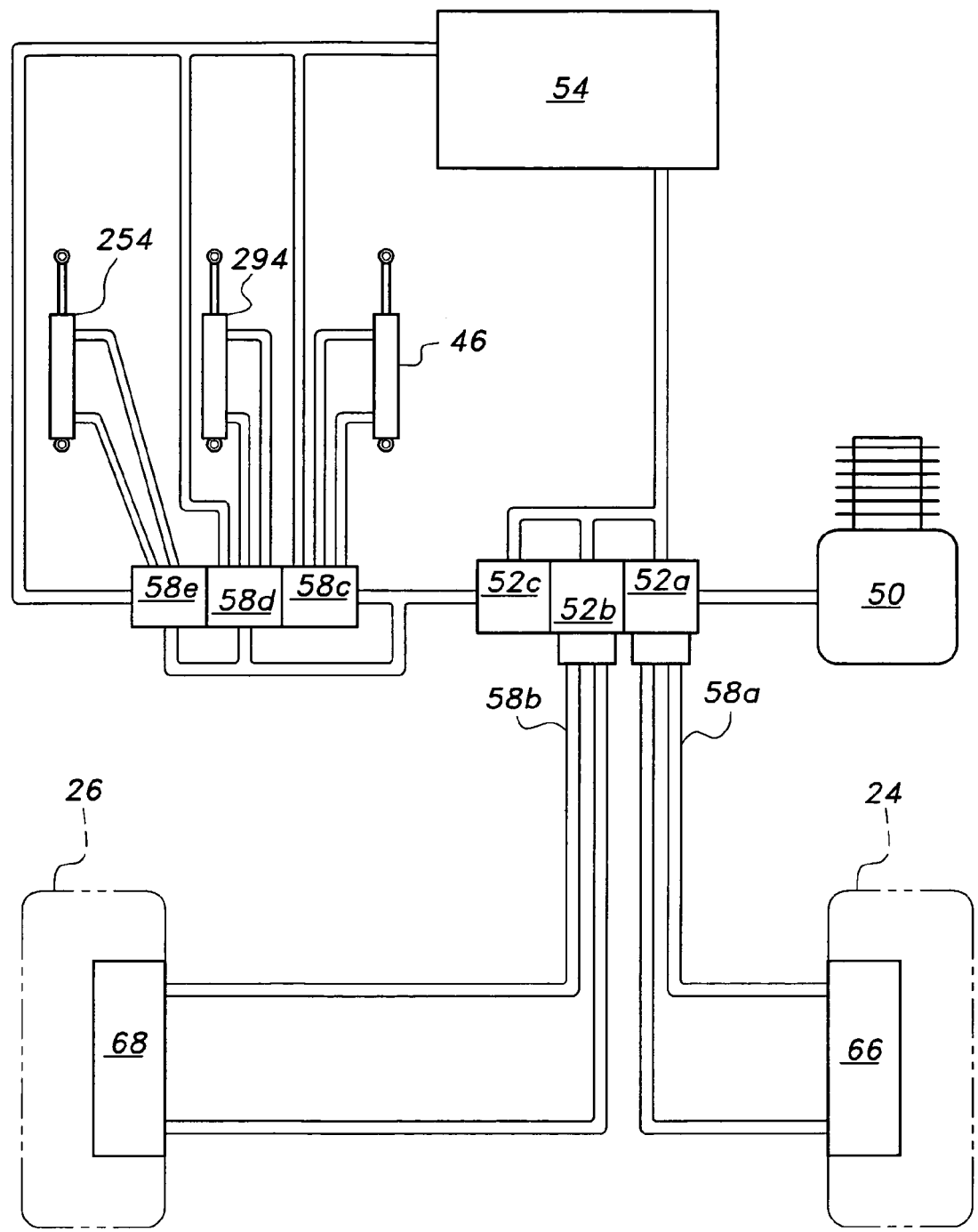
FIG. 20 is a schematic view of the hydraulic system of the powered hand truck of FIGS. 16 through 19.
Figure 21:
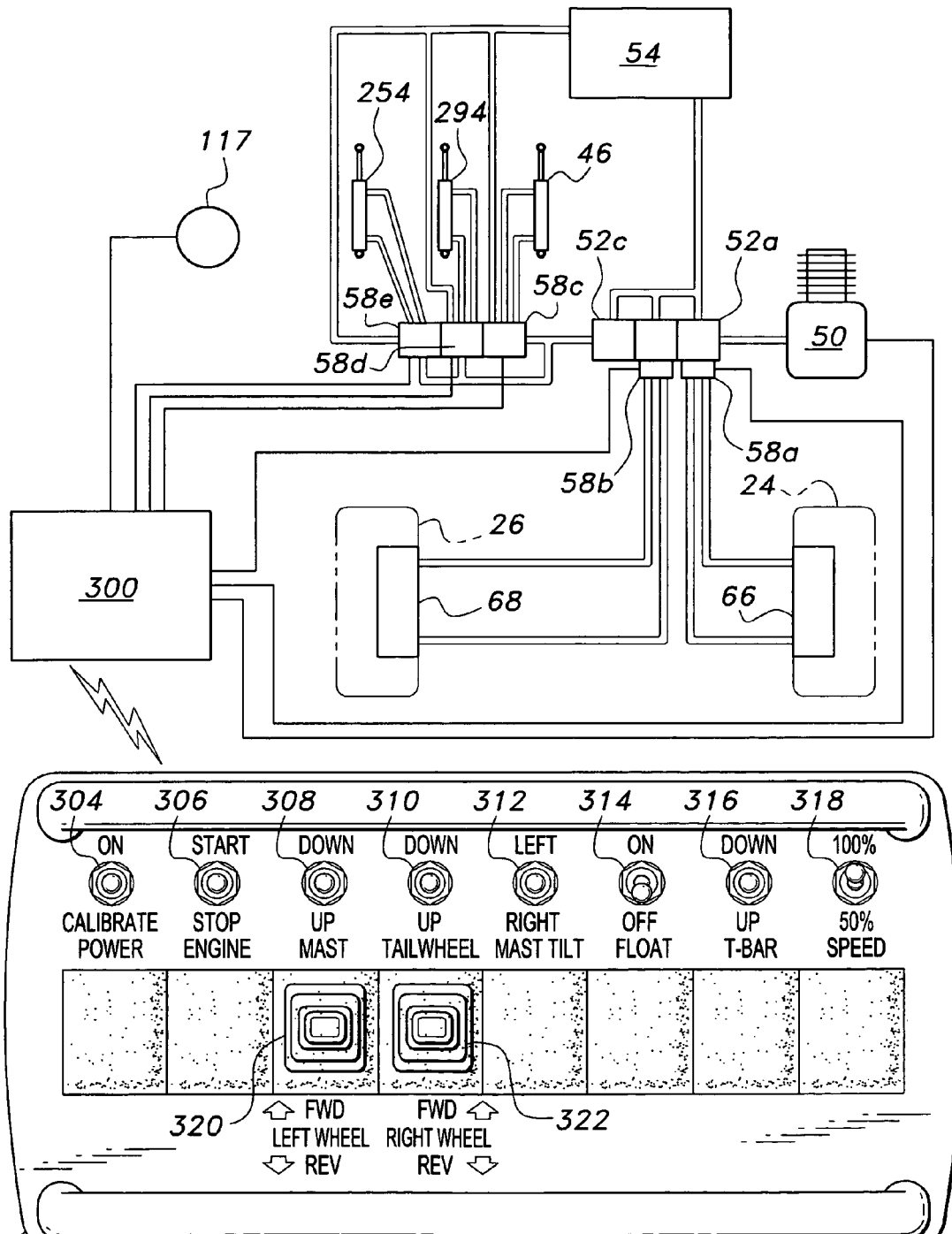
FIG. 21 is a schematic view of a remote control system for the powered hand truck of FIGS. 16 through 20.

FIG. 20 of the drawings provides a schematic drawing of an exemplary hydraulic system for powering the powered hand truck 210, with some of the components also being shown in other drawings. The hydraulic system is powered by a prime mover 50, e.g., an internal combustion engine, etc., installed generally medially upon the chassis 212. Alternatively, an electric motor may be used, drawing power from electrical storage batteries carried aboard the hand truck 210, or alternatively by grid power delivered by an electrical cord or line. The prime mover 50 in turn drives a series of hydraulic pumps 52a through 52c, which receive hydraulic fluid from a reservoir or tank 54. The pumps 52a and 52b provide hydraulic fluid under pressure through control valves 58a, 58b to the left and right drive wheel hydraulic motors, respectively 66 and 68 that drive the wheels 24 and 26. Conventional pressure regulator and/or restrictor valves, etc. (not shown) may be provided in the hydraulic system, as required.

The third hydraulic pump 52c provides hydraulic fluid under pressure to a series of three control valves 58c, 58d, and 58e. The first control valve 58c of this three valve series controls the hydraulic cylinder 46 for raising and lowering the forklift mast 38, as has been described further above.

The second valve 58d of the three valve series controls an axle tilt control hydraulic cylinder 294, which replaces the two pressurized strut elements 94 used to control axle motion in the powered hand truck embodiments 10 and 10a discussed further above. This assembly is shown in FIG. 19 of the drawings. The basic structure is essentially identical to that shown in FIG. 4 of the drawings, i.e., the forklift support column 28 has an axle attachment bracket assembly 90 depending therefrom, with the axle 18 being secured to the bracket assembly 90 by an axle pivot bolt 88. However, positive control of the axle tilt is achieved by means of the axle tilt control cylinder 294 in the case of the powered hand truck 210 embodiment. As the cylinder 294 is double acting, only a single cylinder is needed. The cylinder 294 may be locked at any extensive position by closing the valve 58d (FIG. 20) to lock the angle of the axle 18 relative to the forklift support column 28, or the axle 18 may be allowed to float by opening the valve 58d to allow hydraulic fluid to flow back and forth unimpeded through the cylinder 294.

Figure 16:
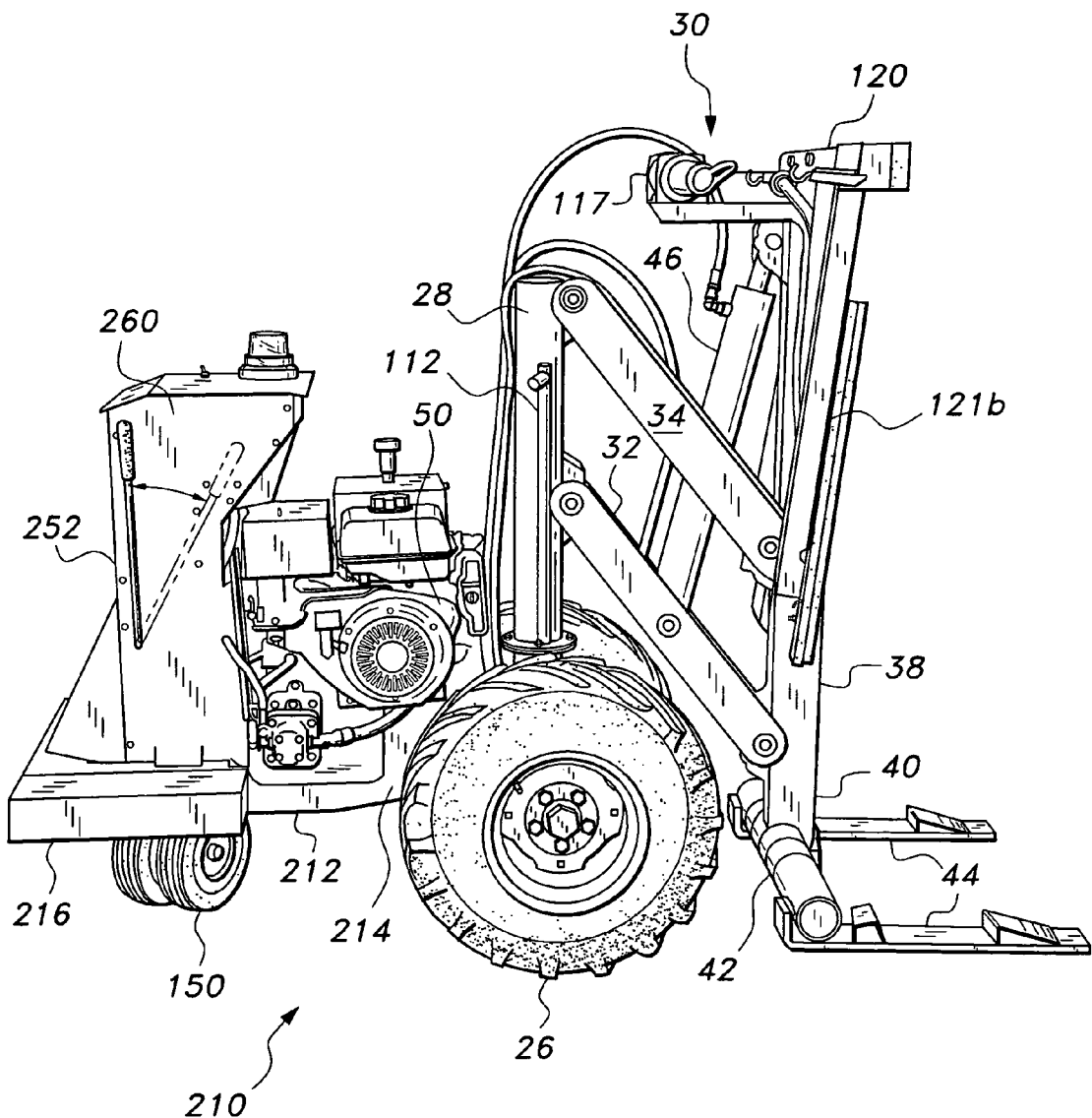
FIG. 16 is a right side elevation view of a third embodiment of a powered hand truck according to the present invention.
Figure 17:
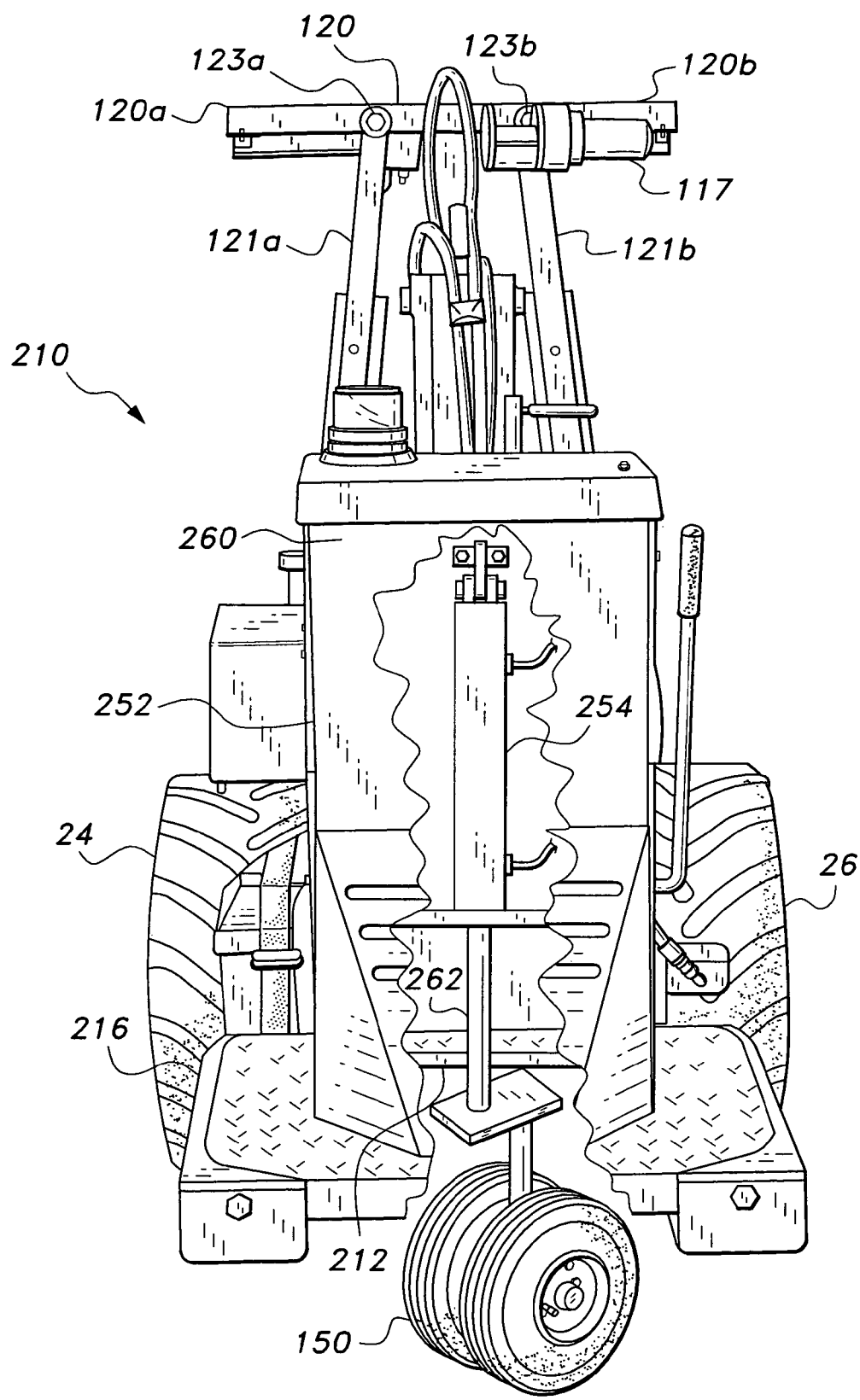
FIG. 17 is a rear elevation view of the powered hand truck of FIG. 16, showing the rear cover partially broken away to illustrate the retraction and extension system for the rear castering wheels.

The third control valve 58e of the three valve series controls hydraulic fluid flow to the caster wheel actuation hydraulic strut 254, which essentially replaces the strut 154 and motor mechanism 158 used to lift and lower the caster wheels 150 of the powered hand truck embodiment 10a of FIGS. 14 and 15. The powered hand truck 210 also includes a set of caster wheels 150 for supporting that end of the chassis 212, but rather than using a drive motor to actuate a retraction and extension strut, the powered hand truck 210 uses a hydraulic strut 254 as shown in FIG. 17. There is no operator console housing per se for the powered hand truck 210 of FIGS. 16 through 21, as it is intended to be remotely controlled (although operator controls may be installed on the powered hand truck 210, if so desired). Rather, the powered hand truck 210 has a caster wheel actuation strut housing 252 over the caster wheel end 216 of the chassis 212. The caster wheel actuation strut 254 is attached to the housing 252 or other suitable structure at its upper end 260, with the opposite caster wheel attachment end 262 being affixed to a structure from which the caster wheel or wheels 150 depends.

Figure 18:
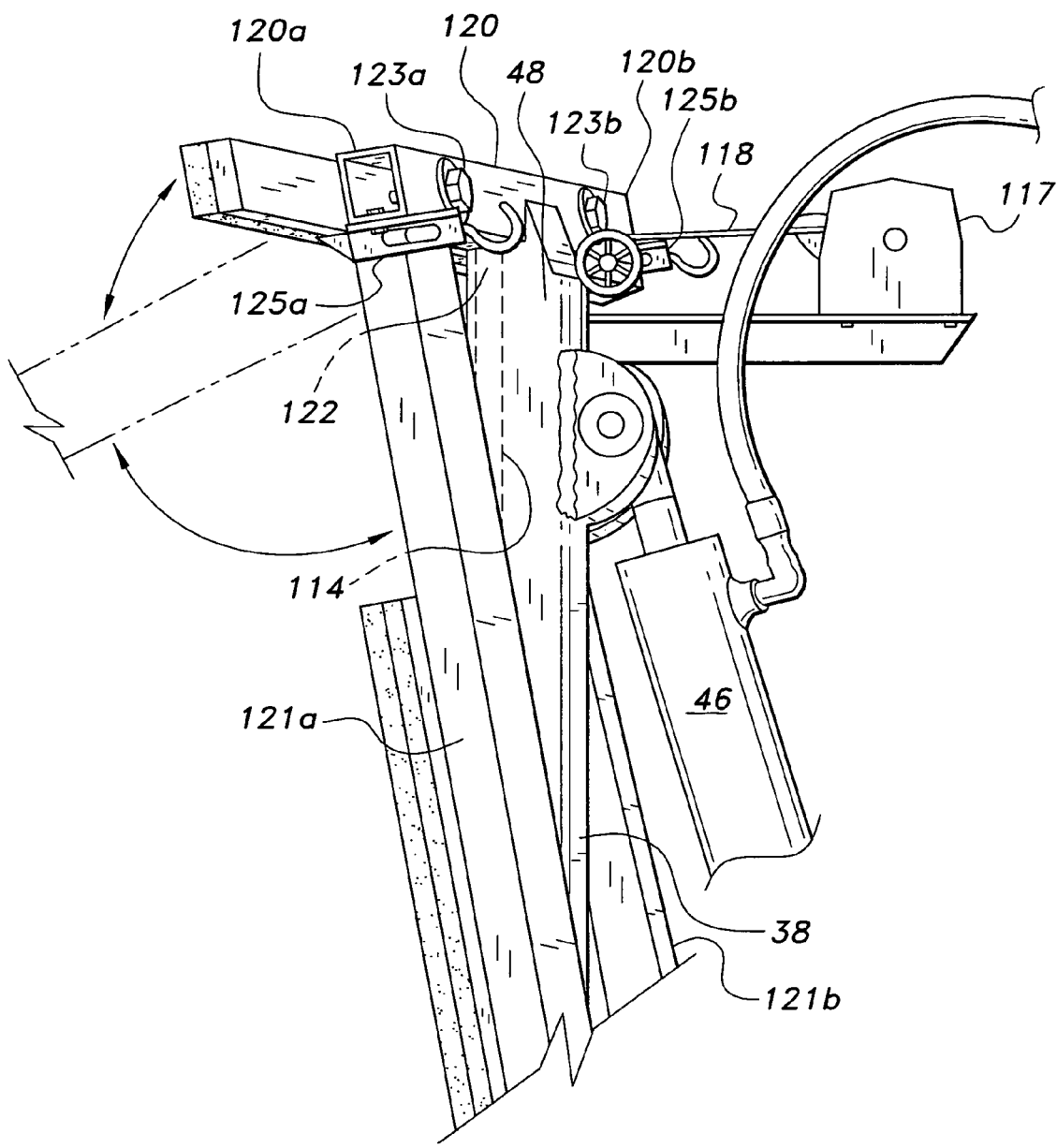
FIG. 18 is a detail perspective view of the upper portion of the mast extension of the powered hand truck of FIG. 16, showing various details thereof.

The powered hand truck 210 also includes a telescoping mast extension, as in the case of the powered hand trucks 10 and 10a of FIGS. 1 through 15. The mast extension apparatus of the powered hand truck 210 is shown in FIGS. 16 through 18. A mast extension column 114 is telescopically disposed within the mast 38, as shown in its retracted position in broken lines in FIG. 18. A generally horizontal crossmember 120 serving as a mast extension clearance standoff is affixed across the upper end 122 of the mast extension column 114. The mast extension 114 and its crossmember 120 are selectively raised and lowered by a powered winch mechanism 117 and cable 118, rather than the manual winch 116 of the powered hand trucks 10 and 10a of FIGS. 1 through 15. The powered winch 117 may be electrically powered, generally as shown in the schematic drawing of the control system in FIG. 21, or may alternatively comprise a hydraulic winch motor conventionally plumbed into the hydraulic system illustrated schematically in FIGS. 20 and 21. In either case the electric or hydraulic power is provided by an onboard system ultimately powered by the prime mover 50, e.g., the hydraulic system illustrated schematically in FIGS. 20 and 21.

The crossmember 120 atop the mast extension 114 includes mutually opposed first and second ends, respectively 120a and 120b. A first and a second crossmember extension, respectively 121a and 121b, are pivotally secured to the ends 120a, 120b of the mast extension standoff crossbar 120 by pivot bolts 123a and 123b. First and second latch assemblies, respectively 125a and 125b, are affixed to the lower surface at each end 120a, 120b of the crossbar 120, with spring loaded sliding tapered latch pins extending forwardly therefrom. The tapered lower faces of the latch pins allow the crossmember extension arms 121a, 121b to be swung upwardly, thereby pushing the latch pins inwardly against their spring pressure in the same manner as a door latch pin contacting the striker plate when a door is closed. The latch pin springs forwardly beneath the respective extension arm 121a, 121b when the arm has been raised to its full horizontal position, i.e., substantially aligned with the crossmember 120, thereby supporting the extension arm 121a, 121b in its fully extended and substantially horizontal position. The latch pins may be retracted by means of the finger loops or hooks extending rearwardly from the latch mechanisms, thereby allowing the extension arms 121a, 121b to drop to their folded positions as shown in FIGS. 16 through 18.

The powered hand truck 210 is remotely operated and controlled, unlike the powered hand truck embodiments 10a and 10b of FIGS. 1 through 15. However, those embodiments 10a and/or 10b may be equipped with the remote operating and control system of the powered hand truck 210 if so desired, or the powered hand truck 210 may be equipped with essentially the same controls as installed on and in the powered hand trucks 10a and 10b, if so desired. The remote operating and control system is shown pictorially and schematically in FIG. 21 of the drawings. The onboard equipment includes a receiver 300 that communicates with the various systems of the machine, e.g., the prime mover 50, the various hydraulic control valves 58a through 58e, and the power winch motor 117. The receiver 300 may actuate conventional servos that in turn operate the components noted above, and/or the components may comprise servo valves where practicable. An exemplary transmitter and receiver system is manufactured by Omnex Control Systems ULC and comprises their R160 receiver and T300 transmitter, both of which may be readily modified or customized for the specific operation and control of the powered hand truck 210.

The receiver 302 includes a series of switches and controls for the operation of various components and systems of the powered hand truck 210. A row of single and double throw toggle switches is provided for most controls, with these switches extending from left to right across the panel of the transmitter 302. These switches will be described in their left-to-right order across the transmitter. It will be seen that the specific order of these control switches is somewhat arbitrary, and may be arranged as desired by the end user of the device.

The first switch is an on/off and calibration switch 304 provided to turn the transmitter 302 on and off. The next switch to the right is a double throw switch 306, with a first position to transmit a signal to start the engine or actuate the prime mover 50 and a second position to transmit a signal to stop the prime mover.

Next in line is the mast elevation control switch 308. This switch controls the lift cylinder 46 that raises and lowers the mast 38 with its forks 44. Immediately to the right of the mast elevation switch 308 is the "tail wheel up and down" switch 310. This switch controls the hydraulic cylinder 254 located within the caster wheel strut housing 252, to raise and lower the caster wheel(s) or "tail wheel" 150 as desired.

The following two switches 312 and 314 both control the axle tilt control cylinder 294. The mast tilt switch 312 causes the hydraulic valve or actuator 58d to open and close in one of two directions, allowing hydraulic fluid to flow under pressure to either end of the cylinder 294 as desired to tilt the forklift support column 28 (and thus the mast 38) laterally to either side relative to the axle 18. Flow to one end of the cylinder 294 will cause the cylinder to extend, thereby driving the end 22 of the axle 18 to which it is connected, downward or away from the forklift support column 28; see FIG. 19. Flow to the opposite end of the cylinder 294 will cause the cylinder to retract, thereby drawing the axle end 22 toward the column 28. When this switch 312 is released, all hydraulic flow to the cylinder 294 is stopped and the relative orientation of the axle 18 and forklift support column 28 is locked, depending upon the position of the float on/off switch 314.

The float on/off switch 314 directs the actuator valve 58d to allow flow back and forth between the two ends of the cylinder 294 if so desired, i.e., the "on" position for float, or to close completely to stop all flow to and from the cylinder 294 to lock the relative positions of the axle 18 and forklift support column 28, i.e., the "off" position for float.

The seventh switch 316 controls the extension and retraction of the mast extension 114 by means of the power winch 117 situated at the top of the forklift mast 38, generally as shown in FIG. 18. Actuation of the winch 117 motor draws the cable 118 onto its drum or reel, thereby raising the mast extension 114. Locking the motor locks the mast extension 114 at the new height, while releasing the motor and allowing it to free wheel allows gravity to pull the mast extension 114 downward.

The final switch at the extreme right of the row of toggle switches is a speed control switch 318. This switch 318 sends a signal to the onboard receiver 300 to control the travel speed of the powered hand truck 210 by means of controlling the hydraulic output to the two wheel hydraulic motors 66 and 68 through the two pumps 52a, 52b and/or their control valves 58a, 58b, or alternatively by controlling the speed and/or power output of the prime mover 50.

The transmitter 302 also provides for specific and precise control of each drive wheel 24 and 26 independently of the other, by means of the two drive wheel control switches 320 and 322. These two switches 320 and 322 control the respective wheel drive motors 66 and 68 independently of one another, allowing the operator to adjust the relative speeds of the two drive wheels 24, 26 independently of one another as desired. This enables the operator to turn the machine 210 e.g. to the left, by reducing rotational speed or stopping the left wheel 24 while maintaining power to the right wheel 26. Tight turns can be made by reversing the rotational direction of one drive wheel while operating the other drive wheel in a forward direction.

In conclusion, the powered hand truck and its storage rack serve to greatly facilitate the movement of relatively large and bulky objects over relatively short distances. The hand truck is particularly well suited for use in moving small, portable skid mounted buildings (e.g., storage and garden sheds, etc.), with the smaller structures needing no additional support other than the lifting of one end of the structure using the forklift mechanism of the hand truck. In the case of larger structures, one end of the structure may be lifted initially for placement of a dolly or the like therebeneath, with the powered hand truck then lifting the opposite end of the structure to move the structure as desired. The powered hand truck and its storage rack will be greatly appreciated by farmers and ranchers, contractors and others employed in the building trades, manufacturers of portable buildings and structures, etc. The powered hand truck and its storage rack will also find great utility in the field of automotive wrecking and recycling yards as well. Accordingly, the powered hand truck and the portability provided by its storage rack will be greatly appreciated by those employed in and involved with innumerable professions and activities.

It is to be understood that the present invention is not limited to the embodiments described above, but encompasses any and all embodiments within the scope of the following claims.

We claim:

1. A powered hand truck, comprising:
   a rigid, unitary chassis having a drive axle end and a caster wheel end opposite the drive axle end;
   a single axle extending laterally across the drive axle end of the chassis, the axle having a first end and a second end opposite the first end;
   first and second drive wheels disposed upon the first end and second end of the axle, respectively;
   a first drive wheel motor and a second drive wheel motor disposed at the first and second drive wheels, respectively;
   a forklift support column extending upwardly from the drive axle end of the chassis, the forklift support column having an upper end and a base;
   upper forklift actuating arms pivotally extending from the upper end of the forklift support column, the upper arms having distal ends;
   lower forklift actuating arms pivotally extending from the forklift support column parallel to the upper forklift actuating arms, the lower arms having distal ends;
   a forklift mast pivotally secured to the distal ends of the upper and lower forklift actuating arms, the forklift mast being parallel to the forklift support column, the forklift mast having an upper end and a lower end;
   a fork attachment arm disposed laterally across the lower end of the forklift mast;
   a pair of laterally spaced apart fork tines extending from the fork attachment arm;
   a forklift actuating cylinder extending between the lower forklift actuating arms and the upper end of the forklift mast;
   a prime mover disposed generally medially upon the chassis, the prime mover selectively communicating with the first and second drive wheel motors and the forklift actuating cylinder; and
   a control system selectively controlling the prime mover, the first and second drive wheels, and the forklift actuating cylinder.

2. The powered hand truck according to claim 1, wherein the control system further comprises:
   a receiver disposed upon the chassis, the receiver controllably communicating with the control system; and
   a transmitter remotely located from the receiver and selectively communicating therewith.

3. The powered hand truck according to claim 1, further including:
   an axle attachment bracket assembly depending from the base of the forklift support column;
   a longitudinally disposed axle pivot bolt extending medially through the axle and axle attachment bracket assembly, the pivot bolt pivotally securing the axle to the base of the forklift support column and defining a longitudinal pivot axis for the axle; and
   a single axle control hydraulic strut disposed between the axle attachment bracket assembly and the axle, the axle control hydraulic strut selectively controlling motion of the axle about the longitudinal pivot axis thereof.

4. The powered hand truck according to claim 1, further including:
- a hydraulic pump driven by the prime mover; and
- a first hydraulic motor and a second hydraulic motor disposed at the first and second drive wheels, respectively, the motors selectively communicating with the hydraulic pump.

5. The powered hand truck according to claim 1, wherein the forklift support column is pivotally mounted upon the chassis.

6. The powered hand truck according to claim 1, further including:
- a caster wheel actuation strut housing disposed above the caster wheel end of the chassis;
- a caster wheel actuation strut disposed within the housing and extending telescopically therefrom, the strut having a fixed upper attachment end and a caster wheel attachment end opposite the upper attachment end; and
- at least one caster wheel extending from the caster wheel attachment end of the strut.

7. The powered hand truck according to claim 1, further including:
- a forklift mast extension telescopically disposed within the forklift mast; and
- a powered forklift mast extension winch disposed at the upper end of the forklift mast, the winch being connected to the forklift mast extension, the winch being powered by the prime mover.

8. The powered hand truck according to claim 7, wherein the forklift mast extension has an upper end, the powered hand truck further comprising:
- a generally horizontal crossmember immovably affixed to the upper end of the forklift mast extension, the crossmember having mutually opposed first and second ends;
- first and second crossmember extensions pivotally secured respectively to the first and second ends of the crossmember; and
- first and second latches disposed respectively upon the first and second ends of the crossmember, the latches supporting the crossmember extensions in substantial alignment with the crossmember when the latches are engaged with the crossmember extensions.

9. A powered hand truck, comprising:
- a chassis having a drive axle end and a caster wheel end opposite the drive axle end;
- a single axle extending laterally across the drive axle end of the chassis, the axle having a first end and a second end opposite the first end;
- first and second drive wheels disposed upon the first end and second end of the axle, respectively;
- a first drive wheel motor and a second drive wheel motor disposed at the first and second drive wheels, respectively;
- a forklift support column extending upwardly from the drive axle end of the chassis, the forklift support column having an upper end and a base;
- a forklift actuating linkage extending from the forklift support column;
- a forklift mast disposed upon the forklift actuating linkage, the forklift mast being parallel to the forklift support column, the forklift mast having an upper end and a lower end;
- a fork attachment arm disposed laterally across the lower end of the forklift mast;
- a pair of laterally spaced apart fork tines extending from the fork attachment arm;
- a forklift actuating cylinder disposed between the forklift support column and the forklift mast;
- a prime mover disposed generally medially upon the chassis, the prime mover selectively communicating with the first and second drive wheel motors and the forklift actuating cylinder;
- a control system selectively controlling the prime mover, first and second drive wheels, and forklift actuating cylinder;
- a receiver disposed upon the chassis, the receiver controllably communicating with the control system; and
- a transmitter remotely located from the receiver and selectively communicating therewith.

10. The powered hand truck according to claim 9, wherein the forklift actuating linkage comprises:
- upper forklift actuating arms pivotally extending from the upper end of the forklift support column, the upper arms having distal ends; and
- lower forklift actuating arms pivotally extending from the forklift support column parallel to the upper forklift actuating arms, the lower arms having distal ends, the forklift mast being pivotally secured to the distal ends of the upper and lower forklift actuating arms, the forklift actuating cylinder extending between the lower forklift actuating arms and the upper end of the forklift mast.

11. The powered hand truck according to claim 9, further including:
- an axle attachment bracket assembly depending from the base of the forklift support column;
- a longitudinally disposed axle pivot bolt extending medially through the axle and axle attachment bracket assembly, the pivot bolt pivotally securing the axle to the base of the forklift support column and defining a longitudinal pivot axis for the axle; and
- a single axle control hydraulic strut disposed between the axle attachment bracket assembly and the axle, the axle control hydraulic strut selectively controlling motion of the axle about the longitudinal pivot axis thereof, the receiver selectively communicating with the axle control hydraulic strut through the control system.

12. The powered hand truck according to claim 9, further including:
- a hydraulic pump driven by the prime mover; and
- a first hydraulic motor and a second hydraulic motor disposed at the first and second drive wheels, respectively, the motors selectively communicating with the hydraulic pump, the receiver selectively communicating with the first and second hydraulic motors through the control system.

13. The powered hand truck according to claim 9, wherein the forklift support column is pivotally mounted upon the chassis.

14. The powered hand truck according to claim 9, further including:
- a caster wheel actuation strut housing disposed above the caster wheel end of the chassis;
- a caster wheel actuation strut disposed within the housing and extending telescopically therefrom, the strut having a fixed upper attachment end and a caster wheel attachment end opposite the upper attachment end; and
- at least one caster wheel extending from the caster wheel attachment end of the strut.

15. The powered hand truck according to claim 9, further including:
- a forklift mast extension telescopically disposed within the forklift mast; and a powered forklift mast extension winch disposed at the upper end of the forklift mast, the winch being connected to the forklift mast extension, the winch being powered by the prime mover, the receiver selectively communicating with the winch through the control system.

16. The powered hand truck according to claim 15, wherein the forklift mast extension further having an upper end, the powered hand truck further comprising:

a generally horizontal crossmember immovably affixed to the upper end of the forklift mast extension, the crossmember having mutually opposed first and second ends;

first and second crossmember extensions pivotally secured respectively to the first and second ends of the crossmember; and first and second latches disposed respectively upon the first and second ends of the crossmember, the latches supporting the crossmember extensions in substantial alignment with the crossmember when the latches are engaged with the crossmember extensions.

* * * * *